US011158329B2

(12) United States Patent
Gopala et al.

(10) Patent No.: US 11,158,329 B2
(45) Date of Patent: Oct. 26, 2021

(54) IDENTIFICATION OF FAKE AUDIO CONTENT

(71) Applicant: Artificial Intelligence Foundation, Inc., Las Vegas, NV (US)

(72) Inventors: Delip Rao Gopala, San Francisco, CA (US); Nishant Subramani, Franklin, TN (US)

(73) Assignee: Artificial Intelligence Foundation, Inc., Las Veggas, NV (US)

( * ) Notice: Subject to any disclaimer, the term of this patent is extended or adjusted under 35 U.S.C. 154(b) by 113 days.

(21) Appl. No.: 16/568,187

(22) Filed: Sep. 11, 2019

(65) Prior Publication Data

US 2021/0074305 A1    Mar. 11, 2021

(51) Int. Cl.
*G10L 19/02* (2013.01)
*G06F 16/65* (2019.01)
*G10L 19/022* (2013.01)
*G06F 16/635* (2019.01)
*G06N 3/08* (2006.01)
(Continued)

(52) U.S. Cl.
CPC ........ *G10L 19/0212* (2013.01); *G06F 16/635* (2019.01); *G06F 16/65* (2019.01); *G06F 21/30* (2013.01); *G06F 21/31* (2013.01); *G06N 3/088* (2013.01); *G10L 17/00* (2013.01); *G10L 19/022* (2013.01); *G10L 25/48* (2013.01); *G06F 21/32* (2013.01)

(58) Field of Classification Search
CPC ........ G06N 3/08; G06N 3/0454; G06N 20/00; G06N 3/088; G06N 3/02; G10L 15/22; G10L 15/16; G10L 25/30; G10L 25/63; G10L 13/08; G10L 15/02; G10L 15/32; G10L 15/1815; G10L 17/00; G10L 17/18; G10L 2015/025; G10L 21/0272; G10L 15/00; G10L 15/08; G10L 15/083; G10L 19/00; G10L 2015/221; G06F 40/30; G06F 3/167; G06F 40/284; G06F 21/32; G06F 40/253; G06F 16/285; G06F 16/3344; G06F 16/65; G06F 40/20; G06K 9/00892; G06K 9/00899
See application file for complete search history.

(56) References Cited

U.S. PATENT DOCUMENTS 10,032,463 B1 * 7/2018 Rastrow ................ G10L 15/183
10,861,476 B2 * 12/2020 Huffman ................ G10L 15/02
(Continued)

*Primary Examiner* — Linda Wong
(74) *Attorney, Agent, or Firm* — Steven Stupp

(57) ABSTRACT

A computer system that classifies audio content is described. During operation, the computer system may receive audio content. Then, the computer system may determine a representation of the audio content (such as a signal-processing representation) by performing a transformation on the audio content. In some embodiments, the transformation may include a neural network and/or the representation may include word embedding or sense embedding of words in the audio content. Moreover, the computer system may analyze the representation using a predetermined neural network. Next, the computer system may classify, based at least in part on an output of the predetermined neural network, the audio content as being fake or real, where the fake audio content is, at least in part, computer-generated. Furthermore, the computer system may selectively perform a remedial action based at least in part on the classification.

20 Claims, 12 Drawing Sheets

(51) Int. Cl.
  *G06F 21/30*     (2013.01)
  *G10L 17/00*     (2013.01)
  *G06F 21/31*     (2013.01)
  *G06F 21/32*     (2013.01)
  *G10L 25/48*     (2013.01)

(56) References Cited

U.S. PATENT DOCUMENTS

2017/0150235 A1*  5/2017  Mei .................. G06F 40/253
2018/0254046 A1*  9/2018  Khoury ............... G10L 17/02
2020/0035247 A1*  1/2020  Boyadjiev .......... G06K 9/00536
2020/0053118 A1*  2/2020  Leng ................. G06N 3/04
2020/0104670 A1*  4/2020  Seo .................. G06F 40/30
2020/0250265 A1*  8/2020  Yang ................. G06F 40/56
2020/0334810 A1* 10/2020  Accomazzi .......... G06N 3/08
2020/0393998 A1* 12/2020  Su ................... G06N 3/08

* cited by examiner

IDENTIFICATION OF FAKE AUDIO CONTENT

FIELD

The described embodiments relate to techniques for identifying fake audio content (such fake speech), e.g., fake audio content that was generated using a neural network.

BACKGROUND

Advances in generating synthetic audio content (such as speech) is enabling a variety of applications. However, simulated audio content can also be used for malicious purposes.

Recent technical advances are allowing malicious parties to generate increasingly realistic fake audio content, and to do so in near real time. Moreover, in conjunction with widely available networks and online platforms (such as social networks), it is now possible for such fake audio content to be rapidly disseminated.

If unchecked, the advent of widely viewed realistic fake audio content poses a threat to the reputations of individuals (e.g., celebrities), companies and governments. Indeed, such forgeries can undermine people's shared sense of objective reality, with commensurate political and social consequences.

SUMMARY

In a first group of embodiments, a computer system that classifies audio content is described. This computer system may include: a computation device (such as a processor); and memory that stores program instructions that are executed by the computation device. During operation, the computer system may receive audio content. Then, the computer system may determine a representation of the audio content by performing a transformation on the audio content. Moreover, the computer system may analyze the representation using a predetermined neural network. Next, the computer system may classify, based at least in part on an output of the predetermined neural network, the audio content as being fake or real, where the fake audio content is, at least in part, computer-generated. Furthermore, the computer system may selectively perform a remedial action based at least in part on the classification.

For example, the transformation may include a Fourier transform or a discrete Fourier transform, and the representation may include a spectrogram and/or a phasegram. Alternatively, the transformation may include a cosine transformation of a power spectrum of the audio content, and the representation may include mel-frequency cepstral coefficients. More generally, the transformation may include a signal-processing transformation or a second neural network. In some embodiments, the representation may include word embedding or sense embedding of words in the audio content.

Moreover, the audio content may be allegedly associated with a given individual and the analysis may further use a predetermined representation of audio content associated with the given individual based at least in part on historical (previously recorded) audio content of the given individual.

Furthermore, the audio content may have an associated context and the predetermined neural network may be selected from a set of predetermined neural networks based at least in part on the context. Alternatively, weights associated with the predetermined neural network may be selected from a set of predetermined weights based at least in part on the context.

Additionally, the predetermined neural network may have been trained using synthetic audio content corresponding to different attack vectors used to generate fake audio content.

In some embodiments, the output may include a probability and the classification may be further based at least in part on a threshold. Note that the audio content may be allegedly associated with the given individual and the threshold may correspond to the given individual (e.g., the threshold may be individual-specific).

Moreover, the predetermined neural network may include multiple convolutional blocks, arranged sequentially, followed by a softmax layer (or a normalized exponential function). A given convolution block may include a given convolution operation, a normalization operation and a max pool operation, and the given convolution operation may correspond to a given frequency range.

Furthermore, the predetermined neural network may include a generative adversarial network (GAN).

Additionally, the classification may be performed using a classifier or a regression model that was trained using a supervised learning technique and a training dataset with additional audio content. Alternatively, the classification may be performed using a classifier or a regression model that was trained using additional audio content that was classified as being fake or real audio content using an unsupervised learning technique.

In some embodiments, the remedial action may include one or more of: providing a warning associated with the audio content; providing a recommendation associated with the audio content; or filtering at least a portion of the audio content (such as removing or changing at least the portion of the audio content).

Another embodiment provides a computer-readable storage medium for use in conjunction with the computer system. This computer-readable storage medium includes the program instructions for at least some of the operations performed by the computer system.

Another embodiment provides a method for classifying the audio content. The method includes at least some of the aforementioned operations performed by the computer system.

In a second group of embodiments, a computer system that trains a neural network is described. This computer system may include: a computation device (such as a processor); and memory that stores program instructions that are executed by the computation device. During operation, the computer system may receive information specifying or associated with a new attack vector corresponding to fake audio content. In response, the computer system may generate a synthetic training dataset based at least in part on the new attack vector, where the synthetic training dataset may include synthetic audio content. Then, the computer system may access a predetermined neural network that classifies real audio content and fake audio content, where the predetermined neural network was training using a second training dataset that excluded the synthetic audio content corresponding to the new attack vector and that is larger than the synthetic training dataset. Next, the computer system may train the neural network based at least in part on the synthetic training dataset and the predetermined neural network, where the training of the neural network may include modifying predetermined weights associated with the predetermined neural network, and where a training time for training the neural network may be less than a training time for training the predetermined neural network.

Moreover, receiving the information specifying or associated with the new attack vector may include identifying the new attack vector based at least in part on one or more instances of the fake audio content.

Furthermore, the synthetic training dataset may be one or more orders of magnitude smaller than the second training dataset.

Additionally, the second training dataset may correspond to a set of known attack vectors corresponding to second fake audio content. For example, the second training dataset may include second synthetic audio content. In some embodiments, the synthetic training dataset may be generated using another neural network.

Note that the predetermined neural network may include convolutional blocks, arranged sequentially, followed by a softmax layer. A given convolution block may include a convolution operation, a normalization operation and a max pool operation, and the given convolution operation may correspond to a given frequency range.

Moreover, the predetermined neural network may include a GAN.

Furthermore, the computer system may assess additional audio content using the neural network. Then, the computer system may selectively perform a remedial action based at least in part on the assessment. For example, the remedial action may include one or more of: providing a warning associated with the additional audio content; providing a recommendation associated with the additional audio content; or filtering at least a portion of the additional audio content (such as removing or changing at least the portion of the audio content).

In a variation on the second group of embodiments, a similar approach may be used to retrain a predetermined neural network to generate output speech for an individual, where the predetermined neural network was generated using a training dataset that did not include speech or synthetic speech for the individual. The predetermined neural network may be selected based at least in part on a gender of the individual, an ethnicity of the individual and/or a demographic attribute associated with the individual.

Another embodiment provides a computer-readable storage medium for use in conjunction with the computer system. This computer-readable storage medium includes the program instructions for at least some of the operations performed by the computer system.

Another embodiment provides a method for training the neural network. The method includes at least some of the aforementioned operations performed by the computer system.

In a third group of embodiments, a computer system that generates output speech is described. This computer system may include: a computation device (such as a processor); and memory that stores program instructions that are executed by the computation device. During operation, the computer system may receive an input associated with a type of interaction. Then, the computer system may generate, using a voice synthesis engine, the output speech corresponding to an individual based at least in part on the input, where the voice synthesis engine predicts positions and duration of a prosodic characteristic of speech by the individual, and selectively adds the prosodic characteristic of the speech by the individual in the output speech based at least in part on the prediction. Note that the prosodic characteristic may include: pauses in the speech by the individual, and/or disfluences in the speech by the individual.

Moreover, the input may include one of: text; or speech of a second individual, who is different from the individual.

Furthermore, the computer system may generate, using a rendering engine, video of a visual representation corresponding to the individual based at least in part on the output speech, where the video of the visual representation may include facial and lip movements corresponding to and synchronized with the generated output speech. Next, the computer system may provide the video of the visual representation and the output speech.

Additionally, the voice synthesis engine may include a recurrent neural network that randomly or pseudo-randomly adds the prosodic characteristic to the output speech based at least in part on a predetermined histogram of occurrences of the prosodic characteristic of the individual during time intervals. For example, the voice synthesis engine may include a long short-term memory model using a recurrent neural network architecture.

In some embodiments, the computer system may determine, using a natural language processing engine, a response based at least in part on the input. Moreover, generating the output speech may include changing, using a natural language processing engine, a lexicography in the response to a different lexicography of the individual.

Moreover, the output speech may be generated based at least in part on a gender of the individual, an ethnicity of the individual and/or a demographic attribute associated with the individual.

Furthermore, the voice synthesis engine may selectively add the prosodic characteristic based at least in part on the type of interaction. For example, the type of interaction may include one of: a conversation, an address to an audience, or reading of text. Additionally, the selective adding may be enabled during the conversation, and may be disabled during the address or the reading of the text.

Another embodiment provides a computer-readable storage medium for use in conjunction with the computer system. This computer-readable storage medium includes the program instructions for at least some of the operations performed by the computer system.

Another embodiment provides a method for generating the output speech. The method includes at least some of the aforementioned operations performed by the computer system.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

The included drawings are for illustrative purposes and serve only to provide examples of possible structures and arrangements for the disclosed systems and techniques. These drawings in no way limit any changes in form and detail that may be made to the embodiments by one skilled in the art without departing from the spirit and scope of the embodiments. The embodiments will be readily understood

Note that like reference numerals refer to corresponding parts throughout the drawings. Moreover, multiple instances of the same part are designated by a common prefix separated from an instance number by a dash.

DETAILED DESCRIPTION

Figure 1:
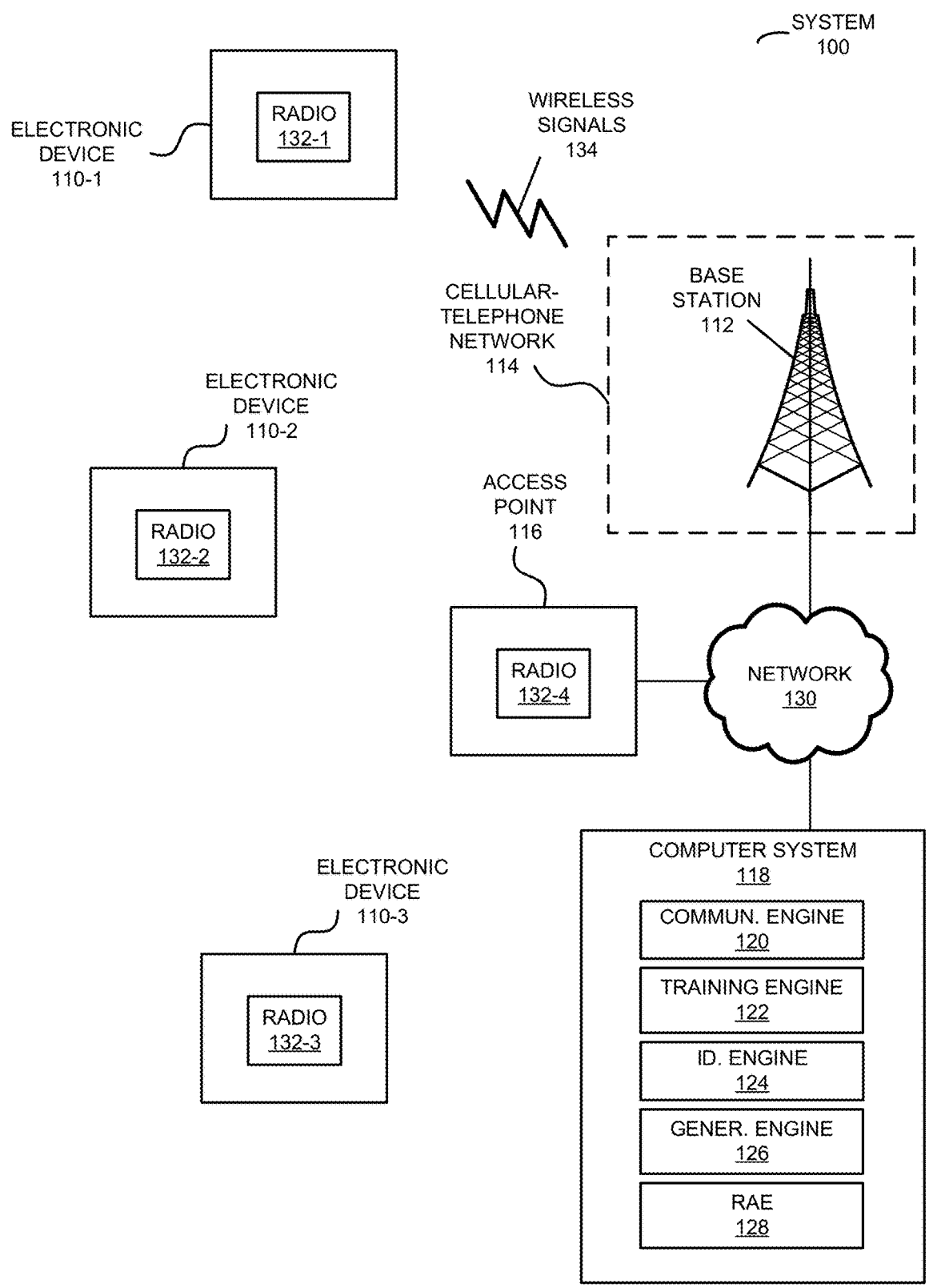
FIG. 1 is a block diagram illustrating an example of a system that identifies fake audio content, trains a neural network and/or generates output speech in accordance with an embodiment of the present disclosure.

In a first group of embodiments, a computer system that classifies audio content is described. During operation, the computer system may receive audio content. Then, the computer system may determine a representation of the audio content (such as a signal-processing representation) by performing a transformation on the audio content. In some embodiments, the transformation may include a neural network and/or the representation may include word embedding or sense embedding of words in the audio content. Moreover, the computer system may analyze the representation using a predetermined neural network. Next, the computer system may classify, based at least in part on an output of the predetermined neural network, the audio content as being fake or real, where the fake audio content is, at least in part, computer-generated. Furthermore, the computer system may selectively perform a remedial action based at least in part on the classification.

By classifying the audio content, these audio analysis techniques may reduce or prevent intentional attempts at disseminating misleading, inaccurate or false information. Moreover, in the process, the audio analysis techniques may help maintain people's belief that audio information is reliable and trustworthy. Furthermore, by helping to ensure that audio content is authentic, the audio analysis techniques may preserve people's shared sense of objective reality, and thus may help prevent adverse social and political impacts. Consequently, the audio analysis techniques may provide an improved user experience when listening to audio content or viewing images and videos that include associated audio content.

In a second group of embodiments, a computer system that trains a neural network is described. During operation, the computer system may receive information specifying or associated with a new attack vector corresponding to fake audio content. In response, the computer system may generate a synthetic training dataset based at least in part on the new attack vector, where the synthetic training dataset may include synthetic audio content. Then, the computer system may access a predetermined neural network that classifies real audio content and fake audio content, where the predetermined neural network was training using a second training dataset that excluded the synthetic audio content corresponding to the new attack vector and that is larger than the synthetic training dataset. Next, the computer system may train the neural network based at least in part on the synthetic training dataset and the predetermined neural network, where the training of the neural network may include modifying predetermined weights associated with the predetermined neural network, and where a training time for training the neural network may be less than a training time for training the predetermined neural network.

By bootstrapping the training of the neural network using the predetermined neural network, these training techniques may significantly simplify and accelerate the training of the neural network. This capability may allow rapid responses to new audio attack vectors. Therefore, the training techniques may reduce or prevent intentional attempts at disseminating misleading, inaccurate or false information. Moreover, in the process, the training techniques may help maintain people's belief that audio information is reliable and trustworthy. Furthermore, by helping to ensure that audio content is authentic, the training techniques may preserve people's shared sense of objective reality, and thus may help prevent adverse social and political impacts. Consequently, the training techniques may facilitate an improved user experience when listening to audio content or viewing images and videos that include associated audio content.

In a third group of embodiments, a computer system that generates output speech is described. During operation, the computer system may receive an input associated with a type of interaction. Then, the computer system may generate, using a voice synthesis engine, the output speech corresponding to an individual based at least in part on the input, where the voice synthesis engine predicts positions and duration of a prosodic characteristic of speech by the individual, and selectively adds the prosodic characteristic of the speech by the individual in the output speech based at least in part on the prediction. Note that the prosodic characteristic may include: pauses in the speech by the individual, and/or disfluences in the speech by the individual.

By generating the output speech with the prosodic characteristic, these audio synthesis techniques may provide more realistic or natural speech. For example, the generated output speech may faithfully (and, thus, believably) reproduce that of an arbitrary individual. Consequently, the audio synthesis techniques may facilitate an improved user experience when listening to synthesized speech or audio content, or when viewing images and videos that include associated synthesized speech audio content. Moreover, the audio synthesis techniques may enable applications that use synthesized speech or audio content.

In the discussion that follows, an individual or a user may be a person. In some embodiments, the techniques are used by a type of organization instead of a user, such as a business (which should be understood to include a for-profit corporation, a non-profit corporation or another type of business entity), a group (or a cohort) of individuals, a sole proprietorship, a government agency, a partnership, etc.

Moreover, in the following discussion, audio content may include sound or information that specifies sound (such as an audio recording) in an audible band of frequencies. For example, audio content may include frequencies between 20 and 20,000 Hz. However, in other embodiments, different (smaller) ranges of frequencies may be used, such as: between 100 and 10,000 Hz, between 300 and 3,400 Hz (e.g., in a voice band), etc. The audio content may include monoaural sound, stereophonic sound, binaural sound, three-dimensional (3D) audio, surround sound, etc. Furthermore, the audio content may have a variety of bit depths, sampling rates and/or encoding techniques, such as: 16-bit, 44.1 kHz pulse-code modulation (PCM); 24-bit, 48 kHz PCM; 24-bit, 96 kHz PCM; 24-bit, 192 kHz PCM; 1-bit, 2.8 MHz direct stream digital or DSD (from Sony Corp. of Sony City Japan, and Koninklijke Philips N.V. of Amsterdam, The Netherlands), etc. Additionally, the audio content may be compatible with a variety of uncompressed audio formats, lossless compressed audio formats, lossy compressed audio formats, and/or video formats. For example, the audio content may be compatible with one or more of: an advanced audio coding (AAC) format, a CD or DVD audio format, a waveform (WAV) audio format, an audio interchange file format (AIFF), a Moving Pictures Expert Group (MPEG)-1 audio layer 3 (MP3) format, an OGG format, a Windows media audio (WMA) format, a free lossless audio codex (FLAC) format, an Apple lossless audio codec (ALAC), another audio format, an Audio Video Interleave (AVI) format, a Flash Video Format (FVF or SWF), a Windows Media Video (WMV), a Quick Time video format, an MPEG 4 or MP4 format, an MOV format, a matroska (MKV) format, an advanced vide coding, high definition (AVCHD) format, and/or another video format.

In the discussion that follows, electronic devices and/or components in a computer system (which may include one or more computers or electronic devices) may communicate using a wide variety of communication protocols. For example, the communication may involve wired or wireless communication. Consequently, the communication protocols may include: an Institute of Electrical and Electronics Engineers (IEEE) 802.11 standard (which is sometimes referred to as 'Wi-Fi®,' from the Wi-Fi Alliance of Austin, Tex.), Bluetooth™ (from the Bluetooth Special Interest Group of Kirkland, Wash.), another type of wireless interface (such as another wireless-local-area-network interface), a cellular-telephone communication protocol (e.g., a 3G/4G/5G communication protocol, such as UMTS, LTE), an IEEE 802.3 standard (which is sometimes referred to as 'Ethernet'), etc. In the discussion that follows, Ethernet, a cellular-telephone communication protocol and/or Wi-Fi are used as illustrative examples.

Communication among electronic devices is shown in FIG. 1, which presents a block diagram illustrating an example of a system 100 that identifies fake audio content, trains a neural network and/or generates output speech. In the following discussion, 'fake' or 'synthesized' audio content may include a file with bit values (corresponding to audio intensity and/or frequencies) that is, at least in part, computer-generated or modified. Moreover, fake audio content may not correspond to real or actual events, or may not faithfully or accurately portray real events (such as a real conversation, speech of an individual, an address to an audience, etc.). Consequently, fake audio content may be designed or intended to mislead, deceive or confuse a listener.

System 100 may include: one or more electronic devices 110 (such as one or more computers and/or one or more portable electronic devices, e.g., one or more cellular telephones), optional base station 112 in cellular-telephone network 114, optional access point 116 (such as a physical access point or a virtual access point that is implemented using software), and/or a computer system 118 (such as one or more computers or servers at one or more locations), which are sometimes collectively referred to as 'components' in system 100. Moreover, computer system 118 may include: communication engine 120 (or module), training engine 122 (or module), identification (ID) engine 124 (or module), generating engine 126 (or module), and/or remedial action engine (RAE) 128 (or module).

Note that components in system 100 may communicate with each other via a network 130, such as the Internet, a cellular-telephone network (such as cellular-telephone network 114) and/or a wireless local area network (WLAN). Thus, the communication may involve wired and/or wireless communication. In embodiments where the communication involves wireless communication, the wireless communication includes: transmitting advertising frames on wireless channels, detecting another component in system 100 by scanning wireless channels, establishing connections (for example, by transmitting association requests), and/or transmitting and receiving packets or frames.

Figure 12:
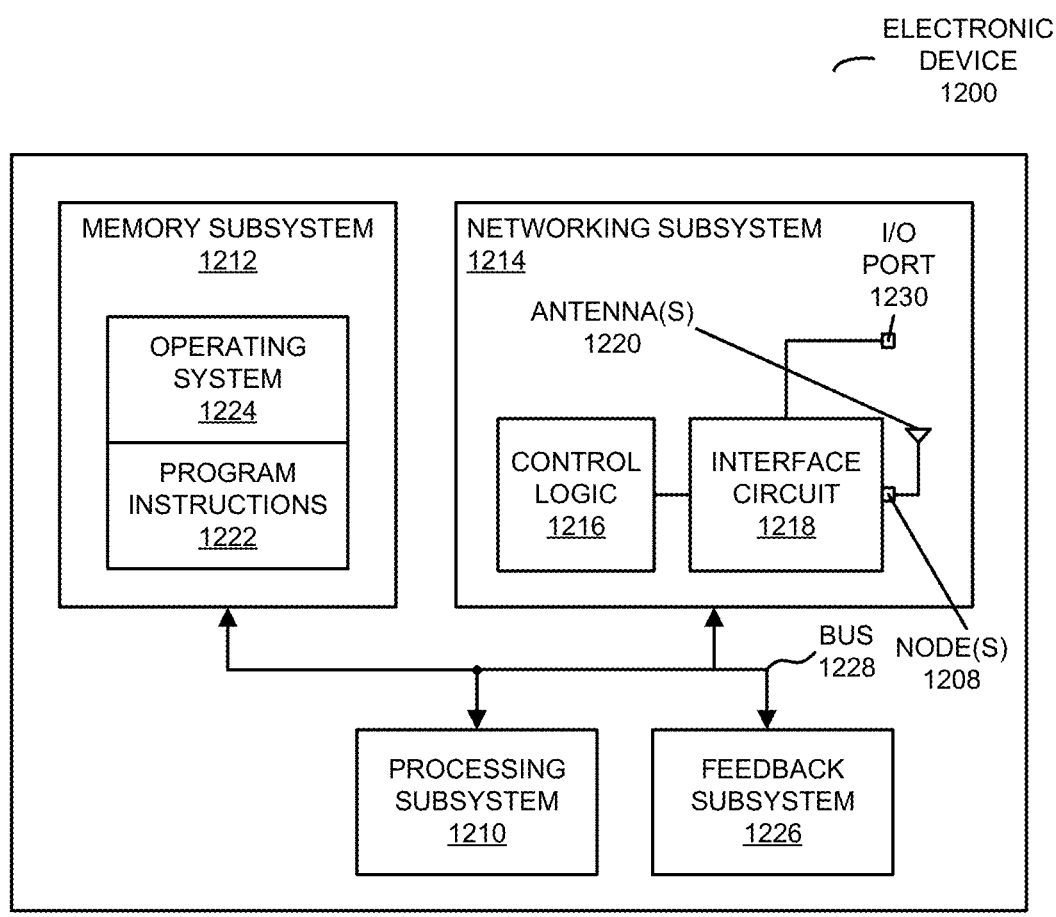
FIG. 12 is a block diagram illustrating an electronic device in accordance with an embodiment of the present disclosure.

As described further below with reference to FIG. 12, the one or more electronic devices 110, the optional base station 112, the optional access point 116 and/or computer system 118 may include subsystems, such as a networking subsystem, a memory subsystem and a processor subsystem. In addition, the one or more electronic devices 110, the optional base station 112, the optional access point 116 and/or computer system 118 may include radios 132 in the networking subsystems. More generally, the components can include (or can be included within) any electronic devices with the networking subsystems that enable these components to communicate with each other. Note that wireless communication can comprise transmitting advertisements on wireless channels to enable a pair of components to make initial contact or detect each other, followed by exchanging subsequent data/management frames (such as association requests and responses) to establish a connection, configure security options (e.g., Internet Protocol Security), transmit and receive packets or frames via the connection, etc.

Moreover, as can be seen in FIG. 1, wireless signals 134 (represented by a jagged line) are transmitted by radios 132 in the components. For example, radio 132-1 in electronic device 110-1 may transmit information (such as packets or frames) using wireless signals. These wireless signals may be received by radios 132 in one or more of the other components, such as by optional base station 112 or optional access point 116. This may allow electronic device 110-1 to communicate information to optional base station 112 or optional access point 116, and thus, to computer system 118.

In the described embodiments, processing a packet or frame in a component may include: receiving the wireless signals with the packet or frame; decoding/extracting the packet or frame from the received wireless signals to acquire the packet or frame; and processing the packet or frame to determine information contained in the packet or frame.

Note that the communication between at least any two of the components in system 100 may be characterized by one or more of a variety of performance metrics, such as: a received signal strength indication (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

As described previously, recent technical advances are allowing malicious parties to generate increasingly realistic fake audio content. In order to address this problem, the audio analysis techniques may be implemented by one or more components in system 100 to identify fake audio content. For example, the audio analysis techniques may be implemented on a given electronic device (such as electronic device 110-1) and/or on computer system 118, i.e., in a distributed or a centralized manner. Notably, in some embodiments, the audio analysis techniques may be implemented using program instructions or software that is executed in an environment on electronic device 110-1, such as an application executed in the operating system of electronic device 110-1, as a plugin for a Web browser or an application tool that is embedded in a web page and that executes in a virtual environment of the Web browser (e.g., in a client-server architecture). Note that the software may be a standalone application or a portion of another application that is resident on and that executes on electronic device 110-1 (such as a software application that is provided by electronic device 110-1 or that is installed on and that executes on electronic device 110-1). When audio content is received or accessed by electronic device 110-1 (such as when a user of electronic device navigates to a Web page that includes audio content), the software may determine whether or not the audio content is likely to be real or fake, and then may perform a remedial action (such as providing a visual indication, alert or notification that indicates how trustworthy the audio content is, e.g., when the audio content is deemed to be fake, or that blocks, changes or filters out suspect audio content or suspect audio content in videos).

Alternatively, in some embodiments, when audio content is received or accessed by electronic device 110-1, software executing in an environment on electronic device 110-1 may upload or provide the audio content, via network 130 (such as cellular-telephone network 114, a WLAN and/or the Internet), to computer system 118. Then, as described further below, computer system 118 may perform the audio analysis techniques and may provide feedback to electronic device 110-1 via network 130. This feedback may include information that specifies whether or not the audio content is likely to be real or fake, and may provide a recommendation for a remedial action. For example, the remedial action may include displaying a graphical icon or color corresponding to the trustworthiness of the audio content (such as green for likely real, yellow for possibly suspect, and red for likely fake) and, more generally, providing a warning associated with the audio content. In some embodiments, the recommended remedial action or recommendation associated with the audio content may include changing, blocking, removing, or not outputting or providing the audio content (or a suspect portion of the audio content), such as when a user is listening to the audio content, or viewing or interacting with a web page.

Thus, the audio analysis techniques may be implemented locally and/or remotely in system 100. In the discussion that follows, a remote and centralized implementation on computer system 118 is used as an illustrative example of the audio analysis techniques. Moreover, in the discussion that follows, a video (or a temporal sequence of images) that includes associated audio content (such as human speech) is used as an illustrative example.

Figure 2:
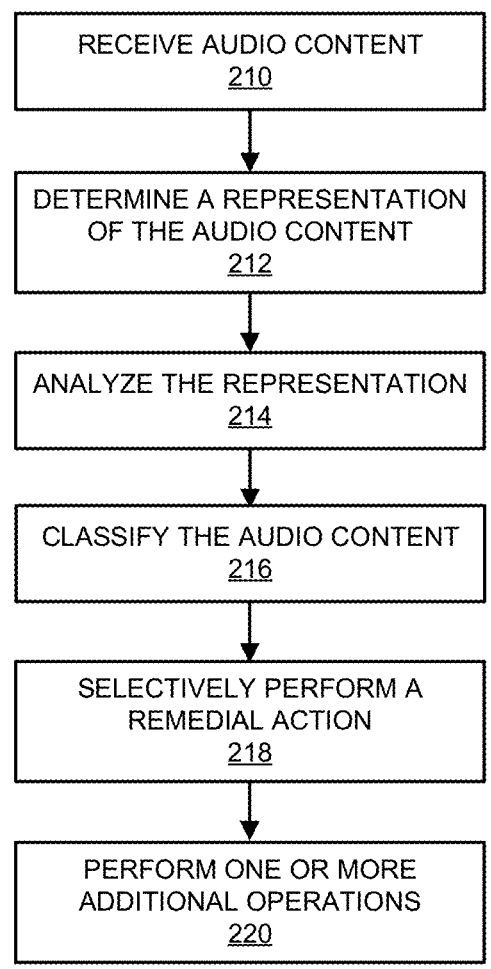
FIG. 2 is a flow diagram illustrating an example of a method for classifying audio content in accordance with an embodiment of the present disclosure.

In these embodiments, as described further below with reference to FIGS. 2-4, communication engine 120 may receive the video from electronic device 110-1. Then, identification engine 124 may perform analysis and classification of the audio content associated with the video. Notably, identification engine 124 may determine a representation of the audio content by performing a transformation on the audio content. For example, the transformation may include a Fourier transform or a discrete Fourier transform, and the representation may include a spectrogram (or magnitude information as a function frequency) and/or a phasegram (or phase information as a function of frequency). Alternatively, the transformation may include a cosine transformation of a power spectrum of the audio content (such as a linear cosine transformation of a logarithm of the power spectrum on a nonlinear mel scale of frequency), and the representation may include mel-frequency cepstral coefficients that collectively make up a mel-frequency cepstrum. More generally, the transformation may include a signal-processing transformation or a neural network. In some embodiments, the representation may include word embedding (or vector representations of words in the audio content) or sense embedding of the audio content (or vector representations of the meanings of words in the audio content). However, other transformations and/or representations may be used, such as audio feature-extraction techniques, including: pitch detection, tonality, harmonicity, spectral centroid, pitch contour, prosody analysis (e.g., pauses, disfluences), syntax analysis, lexicography analysis, principal component analysis, or another feature extraction technique that determines a group of basis features, at least a subset of which allow discrimination of fake or real audio content. Note that the representation may be agnostic to the language of the audio content and, thus, may not involve natural language processing.

Moreover, identification engine 124 may analyze the representation using a predetermined neural network (such as a convolutional neural network, a recurrent neural network, one or more multi-layer perceptrons, a combination of the neural networks, or, more generally, a neural network that is trained to discriminate between fake and real audio content). This predetermined neural network may have been trained using synthetic audio content corresponding to different attack vectors (or approaches) used to generate fake audio content. As described further below with reference to FIG. 4, the predetermined neural network may include multiple convolutional blocks, arranged sequentially, followed by a softmax layer (or a normalized exponential function). A given convolution block may include a given convolution operation, a normalization operation (such as a batch normalization) and a max pool operation, and the given convolution operation may correspond to a given frequency range (such as a frequency range in an audible band of frequencies). In some embodiments, the predetermined neural network may include a GAN, in which adversarial feedback between a generator and a discriminator may be used to identify fake audio content.

Next, identification engine 124 may classify, based at least in part on an output of the predetermined neural network, the audio content as being fake or real, where the fake audio content is, at least in part, computer-generated. (Alternatively, the output of the predetermined neural network may be the classification.) Note that, in the present and subsequent discussion, 'classification' should be understood to mean providing a discrete or a continuous output value (such as a greyscale value or a probability, e.g., a value of a posterior probability distribution over the classes real and fake). Therefore, in some embodiments 'classification' may involve the use of a threshold (such as a value between 0 and 1, e.g., 0.5) that the output of the predetermined neural network is compared to in order to decide whether given audio content associated with a video is real or fake. Note that the audio content may be allegedly associated with the given individual and the threshold may correspond to the given individual (e.g., the threshold may be individual-specific).

In some embodiments, the audio content may be allegedly associated with a given individual and the analysis may further use a predetermined representation of audio content associated with the given individual based at least in part on historical (previously recorded) audio content of the given individual (e.g., as an input to the predetermined neural network).

Furthermore, the audio content may have an associated context (such as an environment in which the audio content allegedly occurs, a gender of the given individual, an ethnicity of the given individual, a demographic attribute of the given individual, etc.) and identification engine 124 may select the predetermined neural network from a set of predetermined neural networks based at least in part on the context. Alternatively, identification engine 124 may select weights associated with the predetermined neural network from a set of predetermined weights based at least in part on the context.

Additionally, remedial action engine 128 may selectively perform a remedial action based at least in part on the classification performed by identification engine 124. For example, remedial action engine 128 may provide, via network 130, a warning or a recommendation associated with the audio content to electronic device 110-1. In response, electronic device 110-1 may display the warning or the recommendation. Alternatively or additionally, remedial action engine 128 may change, filter, delete or block access to the audio content or at least a portion of the content in the audio content (or provides, via network 130, instructions to electronic device 110-1 to change, filter, delete or block access to the audio content or at least a portion of the audio content).

In some embodiments, via communication engine 120, a user or operator of computer system 118 may provide feedback to computer system 118 about the performance of the classification of audio content. In these embodiments, remedial action engine 128 may use this feedback to automatically perform reinforced learning on the predetermined neural network or classifier, or may generate a revised neural network or classifier. Consequently, the audio analysis techniques may allow closed-loop adaptation of the predetermined neural network or classifier. Note that the adaptation based at least in part on user feedback may be performed: continuously, periodically or as needed (such as depending on the performance, e.g., the accuracy, of the identification of fake audio content). In these ways, the accuracy of the audio analysis techniques may be improved, so that, over time, the accuracy is improved to better than 80, 90, 95 or 99%.

While the preceding discussion illustrated the audio analysis techniques as using the predetermined neural network, alternatively or additionally, in other embodiments the analysis of the audio content may involve the use of a supervised or an unsupervised machine-learning model. For example, the classification may be performed using a classifier or a regression model that was trained using a supervised learning technique (such as a support vector machine, a classification and regression tree, logistic regression, LASSO, linear regression and/or another linear or nonlinear supervised-learning technique) and a training dataset with additional (real and/or synthetic) audio content. Alternatively, the classification may be performed using a classifier or a regression model that was trained using additional audio content that was classified as being fake or real audio content using an unsupervised learning technique (such as a clustering technique). In some embodiments, the analysis uses a machine-learning model instead of the predetermined neural network.

Prior to analyzing and classifying the audio content, software in computer system 100 (such as the predetermined neural network) may be trained by training engine 122 (such as using gradient descent optimization). In order to facilitate the training, communication engine 120 may collect: a large number of instances of real audio content; and a large number of instances of fake audio content (which may be associated with a multitude of voice conversion and speech synthesis systems). Alternatively or additionally, training engine 122 may generate synthetic audio content for use in the training.

However, in some embodiments second (fake) audio content may be generated using a new approach or method (which is henceforth referred to as a 'new attack vector') that was not incorporated when the predetermined neural network was trained. Consequently, the predetermined neural network may not be able to correctly identify that the additional fake audio content is, in fact, fake (i.e., false negatives may occur). In principle, this problem may be addressed by training another neural network using instances of the additional fake audio content and/or synthetic audio content corresponding to the additional fake audio content (e.g., using the new attack vector). In practice, it may be time-consuming and cumbersome to obtain or generate sufficient training data in order to train another neural network (and, in some situations, the new attack vector may remain unknown, which may make it difficult to generate synthetic training data). This delay may allow the second audio content to be further disseminated and, thus, to cause extensive damage before remediation (in the form of an improved identification model) is available.

Figure 5:
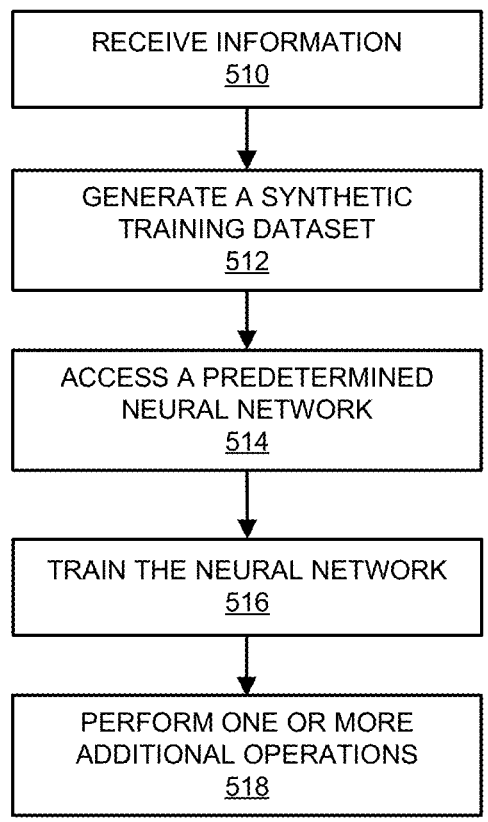
FIG. 5 is a flow diagram illustrating an example of a method for training a neural network in accordance with an embodiment of the present disclosure.

As described further below with reference to FIGS. 5 and 6, transfer learning may be used to help address this problem. Notably, communication engine 120 may receive a second video from electronic device 110-3. Then, identification engine 124 may perform analysis and classification of second audio content associated with the second video. Identification engine 124 may determine that the second audio content is fake audio content corresponding to a new attack vector. For example, while the predetermined neural network may not have been trained to identify the second audio content as fake audio content, other information may alert computer system 118 in this regard, such as a warning alert received by communication engine 120 from electronic devices 110-1 and 110-2 (i.e., communal or social identification or fake or suspect audio content). Alternatively or additionally, the analysis and classification by identification engine 124 may provide a third output class (other than real or fake) for suspect audio content corresponding to an unknown (and, thus, potentially new) attack vector and/or identification engine 124 may determine one or more characteristics of the new attack vector using the second audio content (such as by transforming and determining a representation of the second audio content). In some embodiments, the analysis and classification by identification engine 124 may use one or more instances of the fake audio content, such as one or more videos or audio clips that contain similar suspect second audio content corresponding to the new attack vector.

In response, training engine 122 may generate a synthetic training dataset based at least in part on the new attack vector, where the synthetic training dataset may include synthetic audio content. Then, training engine 122 may access a predetermined neural network (which may be the same as or different from the predetermined neural network described previously) that classifies real audio content and fake audio content, where the predetermined neural network was training using a second training dataset that excluded the synthetic audio content corresponding to the new attack vector and that is larger than the synthetic training dataset. For example, the synthetic training dataset may be one or more orders of magnitude smaller than the second training dataset, such as 100-10,000× smaller. Moreover, the second training dataset may correspond to a set of known attack vectors corresponding to second fake audio content. In some embodiments, the second training dataset may include second synthetic audio content.

Furthermore, the synthetic training dataset may be generated using another neural network (such as a convolutional neural network, a recurrent neural network and/or a GAN).

Next, training engine 122 may train a neural network based at least in part on the synthetic training dataset and the predetermined neural network, where the training of the neural network may include modifying predetermined weights associated with the predetermined neural network, and where a training time for training the neural network may be less than a training time for training the predetermined neural network. For example, the training time may be one or more orders of magnitude faster, such as 10-1,000× faster, such as 1-2 hrs. instead of 50-60 hrs. Thus, the neural network may be generated significantly more rapidly by retraining the predetermined neural network using a far smaller synthetic training dataset, which may allow computer system 118 to swiftly respond to a dynamic or shifting adversarial situation.

In some embodiments, the predetermined neural network and/or the neural network may be a convolutional neural network, a recurrent neural network and/or a GAN. As described further below with reference to FIG. 4, the predetermined neural network and/or the neural network may include multiple convolutional blocks, arranged sequentially, followed by a softmax layer (or a normalized exponential function). A given convolution block may include a given convolution operation, a normalization operation (such as a batch normalization) and a max pool operation, and the given convolution operation may correspond to a given frequency range (such as a frequency range in an audible band of frequencies).

Once the neural network is trained, identification engine 124 may use it to analyze and classify additional audio content. For example, communication engine 120 may receive additional video from electronic device 110-2. Then, identification engine 124 may perform analysis and classification of the additional audio content associated with the additional video using the (retrained and, thus, the now predetermined) neural network. As described previously, this may involve identification engine 124 transforming and determining a representation of the additional audio content, analyzing the representation using the neural network, and classifying, based at least in part on an output of the neural network, the additional audio content as being fake or real. Next, remedial action engine 128 may selectively perform a remedial action based at least in part on the classification performed by identification engine 124.

Computer system 118 may use related technology (e.g., one or more neural networks) to generate and provide approved synthetic audio and/or video content to electronic devices 110. Notably, as described further below with reference to FIG. 7, generating engine 126 may a realistic audio and visual representation of an individual (which is sometimes referred to as a 'mind twin' or a 'puppet'). A mind twin may provide or have authentic (i.e., human-like) interactions and emotional responses, such as during a conversation with a user of one of electronic devices 110. Moreover, the mind twin may accurately mimic the appearance, behaviors and mannerisms of the individual, such that the user may find the mind twin to be a faithful (or even, to a human eye/ear, an indistinguishable) representation of the individual. For example, the mind twin or puppet may be controlled by one or more 'strings' or inputs, such as received speech or text, a facial expression, a gaze direction, a head position, posture and/or perceived emotions. In some embodiments, computer system 118 may provide a mind twin in real time, i.e., that dynamically responds to inputs received from a user in real time.

One challenge to providing a faithful representation of an individual is accurately simulating the individual's voice/speech. For example, depending on the circumstances (such as context, e.g., a type of interaction or an environment in which an interaction occurs), an individual's voice or speech may include elements that are individual phonetic segments (vowels and consonants), but are properties of syllables and larger units of speech, such as intonation, tone, stress and rhythm. Collectively, these characteristics of an individual's speech are referred to as 'prosody.' For example, a prosodic feature or characteristic can include: a pitch contour, pauses and/or disfluences (such as 'um', 'er', etc.). As noted previously, prosodic characteristics in an individual's speech can be time-variant or dynamic (e.g., depending on the circumstances). Moreover, an occurrence of an instance of a prosodic characteristic is typically not a purely random or stochastic event. These complexities can make it difficult accurately simulate prosody in an individual's speech.

As described further below with reference to FIGS. 8-11, these problems may be addressed by a voice synthesis engine in computer system 118. Notably, computer system 118 may conduct a type of interaction with a user of one of electronic devices 110 (such as electronic device 110-1). For example, the type of interaction may include one of: a conversation, an address to an audience, or reading of text. In the discussion that follows, an interactive or dynamic conversation (such as a written or spoken dialog) is used as an illustrative example.

During the conversation, communication engine 120 may an input from electronic device 110-1. For example, the input may include one of: text; or speech of a second individual, who is different from the individual. In response, generating engine 126 may generate, using the voice synthesis engine, output speech corresponding to an individual based at least in part on the input, where the voice synthesis engine predicts positions (as a function of time, such as between words in the output speech) and duration of a prosodic characteristic of speech by the individual, and selectively adds the prosodic characteristic of the speech by the individual in the output speech based at least in part on the prediction. For example, as described further below with reference to FIG. 11, the prediction of the temporal positions and duration of the prosodic characteristic may be based at least in part on a predetermined histogram of occurrences of the prosodic characteristic as a function of time interval in the individual's speech. This histogram may be an input to the voice synthesis engine or may be included or integrated into the voice synthesis engine (such as during training of a neural network). Note that the prosodic characteristic may include: pauses in the speech by the individual, and/or disfluences in the speech by the individual.

In some embodiments, generating engine 126 may determine, using a natural language processing engine (such as a neural network), a response based at least in part on the input, and the output speech may be generated based at least in part on the response. Moreover, generating the output speech may include changing, using the same or another natural language processing engine, a lexicography in the response to a different lexicography of the individual. Furthermore, the output speech may be generated based at least in part on a gender of the individual, an ethnicity of the individual and/or a demographic attribute associated with the individual. For example, the voice synthesis engine may use different parameters or models to generate the output speech dependent on the gender, ethnicity and/or demographic attribute.

Additionally, the voice synthesis engine may selectively add the prosodic characteristic based at least in part on the type of interaction. For example, the selective adding may be enabled during the conversation, and may be disabled during the address or the reading of the text.

As described further below with reference to FIG. 8, the voice synthesis engine may include a recurrent neural network that randomly or pseudo-randomly adds the prosodic characteristic to the output speech based at least in part on a predetermined histogram of occurrences of the prosodic characteristic of the individual during time intervals. For example, the voice synthesis engine may include a long short-term memory model using a recurrent neural network architecture.

Furthermore, generating engine 126 may generate, using a rendering engine (such as a neural network), video of a visual representation (such as a mind twin) corresponding to the individual based at least in part on the output speech, where the video of the visual representation may include facial and lip movements corresponding to and synchronized with the generated output speech. Next, communication engine 120 may provide the video of the visual representation and the output speech to electronic device 110-1 for display, output or presentation to the user.

In some embodiments, training engine 122 and generating engine 126 may use transfer learning to accelerate the training or construction of a model (such as a voice synthesis engine, e.g., a neural network) that can be used to generate output speech corresponding to the individual. For example, when a mind twin for a new individual (who has not been previously been modeled) is desired, a predetermined neural network (which was training using a training dataset based real or simulated or synthetic audio content for one or more other or different individuals) may be retraining using a smaller real or synthetic training dataset with audio content of the individual. During this training, weights for the predetermined neural network may be modified. Note that the predetermined neural network may be selected from a set of predetermined neural networks based at least in part on a gender of the individual, an ethnicity of the individual and/or a demographic attribute associated with the individual. Thus, a predetermined neural network that is related to or similar to the eventual retrained neural network may be selected.

Although we describe the network environment shown in FIG. 1 as an example, in alternative embodiments, different numbers or types of electronic devices may be present. For example, some embodiments comprise more or fewer components. As another example, in another embodiment, different components are transmitting and/or receiving packets or frames.

We now further describe the audio analysis techniques. FIG. 2 presents embodiments of a flow diagram illustrating an example of a method 200 for classifying audio content, which may be performed by a computer or a computer system (such as computer system 118 in FIG. 1). Notably, the computer system may include a computation device that performs method 200. For example, the computation device may include one or more of: a processor, one or more cores in a second processor, or another type of device that performs computation (such as one or more GPUs, which may implement a neural network).

During operation, the computer system may receive audio content (operation 210). Then, the computer system may determine a representation of the audio content (operation 212) by performing a transformation on the audio content. For example, the transformation may include a Fourier transform or a discrete Fourier transform, and the representation may include a spectrogram and/or a phasegram. Alternatively, the transformation may include a cosine transformation of a power spectrum of the audio content, and the representation may include mel-frequency cepstral coefficients. More generally, the transformation may include a signal-processing transformation or a neural network. In some embodiments, the representation may include word embedding or sense embedding of the audio content.

Moreover, the computer system may analyze the representation (operation 214) using a predetermined neural network. Note that the predetermined neural network may have been trained using synthetic audio content corresponding to different attack vectors used to generate fake audio content. In some embodiments, the predetermined neural network may include a GAN, a convolutional neural network and/or a recurrent neural network. For example, the predetermined neural network may include multiple convolutional blocks, arranged sequentially, followed by a softmax layer (or a normalized exponential function). A given convolution block may include a given convolution operation, a normalization operation and a max pool operation, and the given convolution operation may correspond to a given frequency range.

Next, the computer system may classify, based at least in part on an output of the predetermined neural network, the audio content (operation 216) as being fake or real, where the fake audio content is, at least in part, computer-generated. Furthermore, the computer system may selectively perform a remedial action (operation 218) based at least in part on the classification. For example, the remedial action may include one or more of: providing a warning associated with the audio content; providing a recommendation associated with the audio content; or filtering at least a portion of the audio content (such as removing or changing at least the portion of the audio content).

In some embodiments, the computer system may optionally perform one or more additional operations (operation 220). For example, the audio content may be allegedly associated with a given individual and the analysis may further use a predetermined representation of audio content associated with the given individual based at least in part on historical (previously recorded) audio content of the given individual.

Moreover, the audio content may have an associated context and the predetermined neural network may be selected from a set of predetermined neural networks based at least in part on the context. Alternatively, weights associated with the predetermined neural network may be selected from a set of predetermined weights based at least in part on the context.

Furthermore, the output may include a probability and the classification may be further based at least in part on a threshold. Note that the audio content may be allegedly associated with the given individual and the threshold may correspond to the given individual (e.g., the threshold may be individual-specific).

Additionally, the classification (operation 216) may be performed using a classifier or a regression model that was trained using a supervised learning technique and a training dataset with additional audio content. Alternatively, the classification (operation 216) may be performed using a classifier or a regression model that was trained using additional audio content that was classified as being fake or real audio content using an unsupervised learning technique.

In some embodiments of method 200, there may be additional or fewer operations. Furthermore, there may be different operations. Moreover, the order of the operations may be changed, and/or two or more operations may be combined into a single operation.

Figure 3:
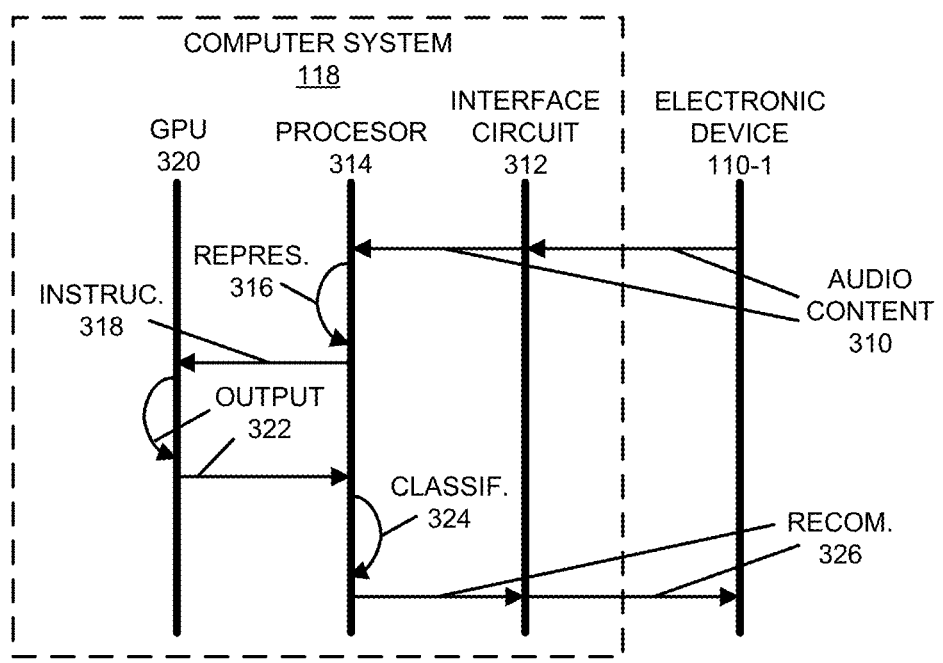
FIG. 3 is a drawing illustrating an example of communication among components in the computer system in FIG. 1 in accordance with an embodiment of the present disclosure.
Figure 4:
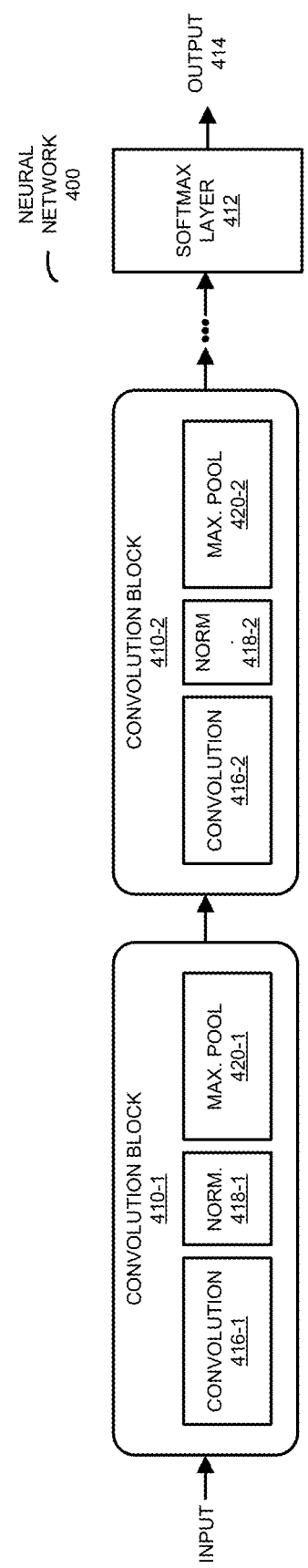
FIG. 4 is a block diagram illustrating an example of a neural network in accordance with an embodiment of the present disclosure.

Embodiments of the audio analysis techniques are further illustrated in FIG. 3, which presents a drawing illustrating an example of communication among components in system 100 (FIG. 1). Notably, during the audio analysis techniques, electronic device 110-1 may provide audio content 310 to computer system 118.

After receiving audio content 310, interface circuit 312 in computer system 118 may provide audio content 310 to processor 314 in computer system 118. Then, processor 314, which executes program instructions, may determine a representation 316 of audio content 310 by performing a transformation on audio content 310.

Next, processor 314 may analyze representation 316 using a predetermined neural network. Notably, processor 314 may provide an instruction 318 to one or more GPUs (such as GPU 320) in computer system 118 to perform analysis on audio content 310 using a predetermined neural network to provide an output 322.

Moreover, based at least in part on output 322, processor 314 may classify 324 audio content 310 as real or fake. Furthermore, based at least in part on classification 324, processor 314 may selectively perform a remedial action. For example, processor 314 may determine a recommendation 326. This recommendation may be provided to interface circuit 312, which communicates recommendation 326 to electronic device 110-1. Notably, recommendation 326 may include an instruction to display a warning or a notification, or to change, block or filter at least a portion of the content in audio content 310. After receiving recommendation 326, electronic device 110-1 may perform an additional operation, such as blocking the output of audio content 310 when audio content 310 has been identified as fake.

While FIG. 3 illustrates unilateral communication between components (as shown using one-sided arrows), in some embodiments one or more of these communication operations involve bilateral communication.

We now further describe neural networks that can be used in any of the embodiments. In the following discussion, the audio analysis techniques are used as an illustrative example. As shown in FIG. 4, which presents a block diagram illustrating an example of a neural network 400, in some embodiments of the audio analysis techniques, one or more operations may be performed using a neural network. Notably, neural network 400 may include multiple convolutional blocks 410, arranged sequentially, followed by a softmax layer 412 (or a normalized exponential function) that provides an output 414 (such as a value that indicates fake or real, or a probability). A given convolution block (such as convolution block 410-1) may include a given convolution operation (such as convolution operation 416-1, which may be different from at least some of the other convolution operations 416), a normalization operation (such as batch normalization 418-1) and a max pool operation (such as max pool operation 420-1) in which a maximum value following the normalization operation is selected. Note that the given convolution operation may correspond to a given frequency range (such as a frequency range in an audible band of frequencies, e.g., 50-500 Hz). In general, different convolution blocks 410 may have different associated frequency bands, which may or may not overlap with the frequency bands associated with adjacent (neighboring) convolution blocks in neural network 400. These capabilities may improve the ability of neural network 400 to model an individual's speech, including nonlinearities.

In some embodiments, a given convolution block (such as convolution block 410-1) may include a 1×1 convolution, a rectified linear unit plus batch normalization, a 3×3 convolution and a second instance of a rectified linear unit and batch normalization. These operations may be followed by a third instance of a rectified linear unit and a 2×2 max pool operation. These blocks may be repeated zero or more times. Alternatively or additionally, in some embodiments, a given convolution block (such as convolution block 410-1) may include a 1×1 convolution, a rectified linear unit plus batch normalization, a 3×3 convolution and a second instance of a rectified linear unit plus batch normalization. The output of this convolution block may be combined with the output of a residual convolution block that includes a 1×1 convolution, a rectified linear unit and batch normalization. Then, the combination of these outputs may be followed by a third instance of a rectified linear unit and a 2×2 max pool operation. These blocks may be repeated zero or more times.

While neural networks can be used to generate fake audio content, as noted previously, in some embodiments the analysis and/or classification operations in the audio analysis techniques are performed, at least in part, by a neural network (e.g., deep learning via a neural network may be used to detect fake audio content).

For example, the audio analysis techniques may use one or more convolutional neural networks. A large convolutional neural network may include, e.g., 60 M parameters and 650,000 neurons. The convolutional neural network may include, e.g., eight learned layers with weights, including, e.g., five convolutional layers and three fully connected layers with a final 1000-way softmax or normalized exponential function that produces a distribution over the 1000 class labels. Some of the convolution layers may be followed by max-pooling layers. In order to make training faster, the convolutional neural network may use non-saturating neurons (such as a local response normalization) and an efficient dual parallelized GPU implementation of the convolution operation. In addition, in order to reduce overfitting in the fully-connected layers, a regularization technique (which is sometimes referred to as 'dropout') may be used. In dropout, the predictions of different models are efficiently combined to reduce test errors. In particular, the output of each hidden neuron is set to zero with a probability of 0.5. The neurons that are 'dropped out' in this way do not contribute to the forward pass and do not participate in backpropagation. Note that the convolutional neural network may maximize the multinomial logistic regression objective, which may be equivalent to maximizing the average across training cases of the log-probability of the correct label under the prediction distribution.

In some embodiments, the kernels of the second, fourth, and fifth convolutional layers are coupled to those kernel maps in the previous layer that reside on the same GPU. The kernels of the third convolutional layer may be coupled to all kernel maps in the second layer. Moreover, the neurons in the fully connected layers may be coupled to all neurons in the previous layer. Furthermore, response-normalization layers may follow the first and second convolutional layers, and max-pooling layers may follow both response-normalization layers as well as the fifth convolutional layer. A nonlinear model of neurons, such as Rectified Linear Units, may be applied to the output of every convolutional and fully-connected layer.

In some embodiments, the first convolutional layer filters, e.g., a 224×224×3 input file with 96 kernels of size 11×11×3 with a stride of four pixels (this is the distance between the receptive field centers of neighboring neurons in a kernel map). Note that the second convolutional layer may take as input the (response-normalized and pooled) output of the first convolutional layer and may filter it with, e.g., 256 kernels of size 5×5×48. Furthermore, the third, fourth, and fifth convolutional layers may be coupled to one another without any intervening pooling or normalization layers. The third convolutional layer may have, e.g., 384 kernels of size 3×3×256 coupled to the (normalized, pooled) outputs of the second convolutional layer. Additionally, the fourth convolutional layer may have, e.g., 384 kernels of size 3×3×192, and the fifth convolutional layer may have 256 kernels of size 3×3×192. The fully-connected layers may have, e.g., 4096 neurons each. Note that the numerical values in the preceding and the remaining discussion below are for purposes of illustration only, and different values may be used in other embodiments.

In some embodiments, the convolutional neural network is implemented using at least two GPUs. One GPU may run some of the layer parts while the other runs the remaining layer parts, and the GPUs may communicate at certain layers. The input of the convolutional neural network may be, e.g., 150,528-dimensional, and the number of neurons in the remaining layers in the convolutional neural network may be given by, e.g., 253, 440-186, 624-64, 896-64, 896-43, and 264-4096-4096-1000.

Note that, with a supervised or labeled data, a few hundred instances of audio content may be needed to train a neural network to identify fake media (such as fake audio content) with 80-85% accuracy, while thousands to tens of thousands of instances of audio content may be needed to train a neural network to identify fake media with 95% accuracy. Alternatively, with unsupervised or unlabeled data, a few hundred thousand instances of audio content may be needed to train a neural network to identify fake media with 70% accuracy, while approximately a million instances of audio content may be needed to train a neural network to identify fake media with 95% accuracy.

Therefore, in some embodiments, artificial intelligence may be used to provide a decentralized or a centralized trusted reality defender, which automatically detects fake audio content or, more generally, content that is, at least in part, computer-generated. This reality defender may provide tools that allow individuals to protect their lives, prosperity, dignity and humanity. Therefore, the reality defender may help users protect themselves against fake truth. For example, the reality defender, which may be based at least in part on deep learning, may be implemented as a Web browser plugin or a software application that can notify users of suspected deception (such as fake media) in real time. Notably, the reality defender may analyze suspected media and may provide warnings or alerts, and/or may filter out identified fake media.

We now further describe the training techniques. FIG. 5 presents a flow diagram illustrating an example of a method 500 for training a neural network, which may be performed by a computer or a computer system (such as computer system 118 in FIG. 1). Notably, the computer system may include a computation device that performs method 200. For example, the computation device may include one or more of: a processor, one or more cores in a second processor, or another type of device that performs computation (such as one or more GPUs, which may implement a neural network).

During operation, the computer system may receive information (operation 510) specifying or associated with a new attack vector corresponding to fake audio content. In response, the computer system may generate a synthetic training dataset (operation 512) based at least in part on the new attack vector, where the synthetic training dataset may include synthetic audio content.

Then, the computer system may access a predetermined neural network (operation 514) (or parameters, weights, architecture information that specify the predetermined neural network) that classifies real audio content and fake audio content, where the predetermined neural network was training using a second training dataset that excluded the synthetic audio content corresponding to the new attack vector and that is larger than the synthetic training dataset. Note that the synthetic training dataset may be one or more orders of magnitude smaller than the second training dataset. Moreover, the second training dataset may correspond to a set of known attack vectors corresponding to second fake audio content. For example, the second training dataset may include second synthetic audio content. In some embodiments, the synthetic training dataset may be generated using another neural network.

Furthermore, the predetermined neural network may include convolutional blocks, arranged sequentially, followed by a softmax layer. A given convolution block may include a convolution operation, a normalization operation and a max pool operation, and the given convolution operation may correspond to a given frequency range. In some embodiments, the predetermined neural network may include a GAN.

Next, the computer system may (re-) train the neural network (operation 516) based at least in part on the synthetic training dataset and the predetermined neural network, where the training of the neural network may include modifying predetermined weights associated with the predetermined neural network, and where a training time for training the neural network may be less than a training time for training the predetermined neural network.

In some embodiments, the computer system may optionally perform one or more additional operations (operation 518). For example, receiving the information specifying or associated with the new attack vector (operation 510) may include identifying the new attack vector based at least in part on one or more instances of the fake audio content.

Moreover, the computer system may assess additional audio content using the neural network. Then, the computer system may selectively perform a remedial action based at least in part on the assessment. For example, the remedial action may include one or more of: providing a warning associated with the additional audio content; providing a recommendation associated with the additional audio content; or filtering at least a portion of the additional audio content (such as removing or changing at least the portion of the audio content).

In some embodiments of method 500, there may be additional or fewer operations. Furthermore, there may be different operations. Moreover, the order of the operations may be changed, and/or two or more operations may be combined into a single operation.

Figure 6:
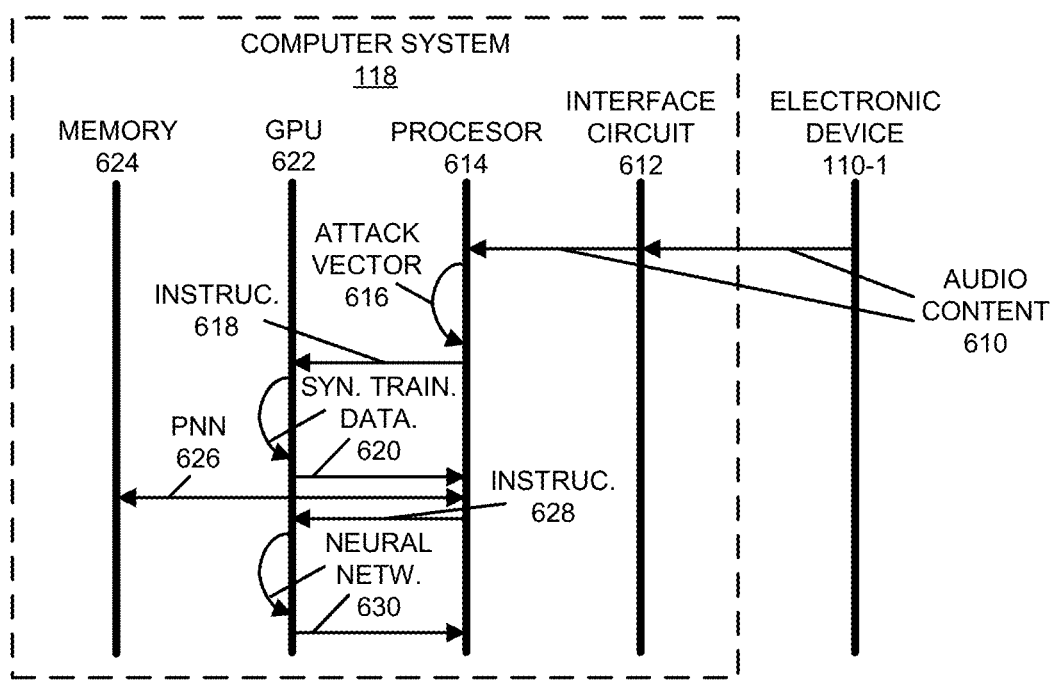
FIG. 6 is a drawing illustrating an example of communication among components in the computer system in FIG. 1 in accordance with an embodiment of the present disclosure.

Embodiments of the training techniques are further illustrated in FIG. 6, which presents a drawing illustrating an example of communication among components in system 100 (FIG. 1). Notably, during the training techniques, electronic device 110-1 may provide audio content 610 to computer system 118. This audio content may correspond to a new attack vector 616 for fake audio content.

After receiving audio content 610, interface circuit 612 in computer system 118 may provide audio content 610 to processor 614 in computer system 118. Then, processor 614, which executes program instructions, may identify the new attack vector 616 from audio content 610. For example, processor 614 may identify the new attack vector 616 by analyzing audio content 610, such as by determine a representation of audio content 610 by performing a transformation on audio content 610.

Then, processor 614 may generate a synthetic training dataset 620 based at least in part on the new attack vector 616. For example, processor 614 may provide an instruction 618 to one or more GPUs (such as GPU 622) in computer system 118 to generate the synthetic training dataset 620 based at least in part on the new attack vector 616.

Next, processor 614 may access, in memory 624 in computer system 118, a predetermined neural network (PNN) 626 that classifies real audio content and fake audio content, where predetermined neural network 626 was training using a second training dataset that excluded the synthetic audio content corresponding to the new attack vector 616 and that is larger than the synthetic training dataset 620.

Next, processor 614 may train a neural network 630 based at least in part on the synthetic training dataset 620 and the predetermined neural network 626, where the training of neural network 630 may include modifying predetermined weights associated with the predetermined neural network 626, and where a training time for training neural network 630 may be less than a training time for training the predetermined neural network 626 (using the second training dataset). For example, processor 614 may provide an instruction 628 to one or more GPUs (such as GPU 622) in computer system 118 to train neural network 630.

Subsequently, processor 614 may use neural network 630 to identify fake audio content corresponding to the new attack vector 616 (e.g., in additional audio content received from electronic device 110-1) and, when fake audio content is identified, to selectively perform a remedial action.

While FIG. 6 illustrates unilateral communication between components (as shown using one-sided arrows), in some embodiments one or more of these communication operations involve bilateral communication.

Figure 7:
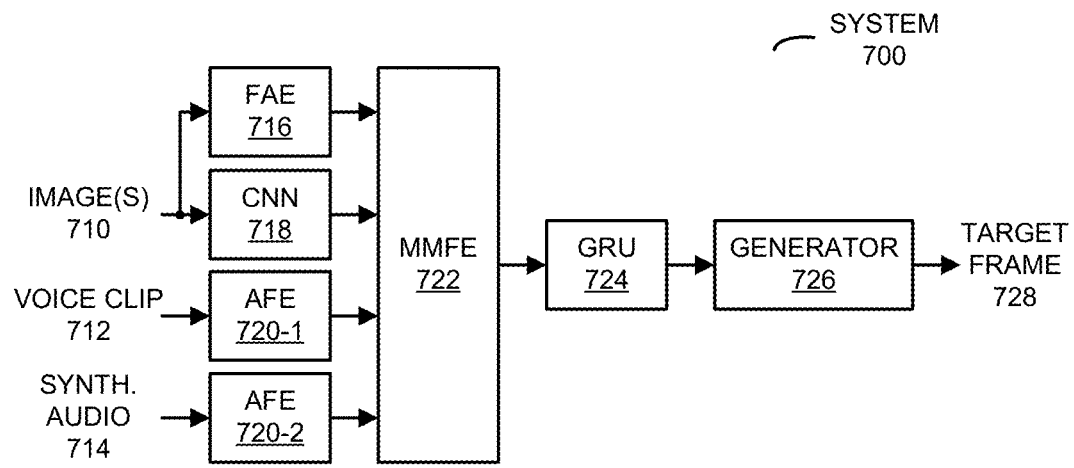
FIG. 7 is a block diagram illustrating an example of a system that generates audio and visual representations in accordance with an embodiment of the present disclosure.

We now further describe the audio synthesis techniques. FIG. 7 presents a block diagram illustrating an example of a system 700 that generates audio and visual representations, e.g., a mind twin or puppet. This system may be included in and/or used with computer system 118 (FIG. 1), and may include one or more neural networks and/or machine-learning models.

The mind twin generated by system 700 may be in response to inputs such as: one or more images 710 of a user's face, a recorded voice clip 712 of the user, and/or synthetic audio 714. Moreover, the mind twin or puppet may provide a likeness of the appearance and personality of an individual being modeled. The response of the mind twin may be controlled by one or more 'strings,' such as a voice input (or extracted text and/or other parameters), one or more facial expressions, a gaze direction, a head pose, non-verbal cues, the user's emotions or emotional state (which may be inferred from analysis of one or more of the inputs), and/or one or more other inputs.

Then, system 700 may analyze the inputs. For example, open-face parameters may be extracted from the one or more images 710 by facial analysis engine (FAE) 716, additional parameters may be determined by convolutional neural network (CNN) 718, and audio features (such as text, an emotional state, etc.) may be extracted by audio feature extractors (AFE) 720 from voice clip 712 and/or synthetic audio 714. Next, a multi-modal fusion engine (MMFE) 722 may combine these determined features to determine a representation for frame $x_t$.

Moreover, a gated recurrent unit (GRU) 724 neural network may provide a representation over time $h_t$ based at least in part on $x_t$. Furthermore, a generator 726 may output a target frame 728 of the mind puppet at time t based at least in part on the representation $h_t$.

Figure 8:
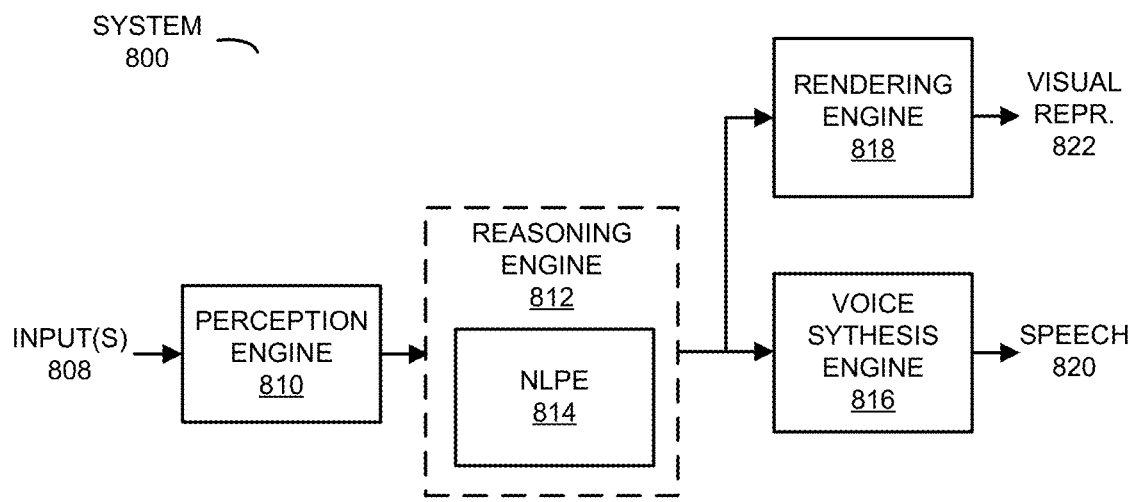
FIG. 8 is a block diagram illustrating an example of a system that generates output speech in accordance with an embodiment of the present disclosure.

FIG. 8 presents a block diagram illustrating an example of a system 800 that generates output speech. This system may be included in and/or used with system 700 (FIG. 7), and may include one or more neural networks and/or machine-learning models.

In system 800, a perception engine 810 may receive one or more inputs 808, such as an audio input of "Good morning" recorded from a user that interacts with a mind twin. Perception engine 810 may output extracted text and/or other parameters (such as an emotional state of the user) based at least in part on the one or more inputs. Note that determining and/or modifying the user's emotional state can provide a motivation to make user more interested in interacting with the mind twin.

Then, a reasoning engine 812 with a natural language processing engine or NLPE 814 (or natural language understanding engine) may determine an appropriate response of the mind twin, such as 'How are you?', which may be said with a smile. Next, voice synthesis engine 816 may output speech 820 based at least in part on the response, and rendering engine 818 may produce a visual representation 822 of the mind twin with a smile that is synchronized with the output speech (e.g., it may convert the output speech or voice to lip movement of the mind twin). Note that rendering engine 818 may produce a face, lip movement, facial muscles, etc., voice synthesis engine 816 may produce audio, and natural language processing engine 814 may produce text (and, more generally, the response).

The synchronization may be implemented using a neural network that predicts lip movement and facial parameters from the output speech (which is the opposite of lip reading). For example, key points $y_t$ around the lips and the lip structure may be detected. Note that the key points may include points on the lips, as well as other facial muscles (thereby providing a dense group of points). Then, a neural network f that maps $x_t$ to $y_t$ may be trained (where the inverse function can read lips to produce audio). Next, a merging neural network (which may be a different function than the original function) may be generated given $x_t$ and $y_t$.

In some embodiments, one or more component in system 800 may be trained using transfer learning from other users (which may be collected or aggregated together) and/or across languages, e.g., based phonetic and/or sub-phonetic features. All humans biologically make the same facial/lip movements (the anatomical structure is biologically invariant). However, there is some small per-subject variation. Because there are lexical and phonetic invariants within a language family, the structure of language can be exploited. For example: German is an agglutinative language. In transfer learning, good representations (such as nonlinear combinations of input features) may be used as seeds to accelerate training. Note that language families have syntax, phonetic, and/or other similarities (e.g., orthographic features), and can be classified in a language atlas (such as tonal, atonal, based on production system, morphology, syntax, other taxonomies, etc.). Consequently, in transfer learning, a bridge language, such as Turkish, can be used to accelerate training between Romance languages, Semitic languages and Indo-European languages.

Figure 9:
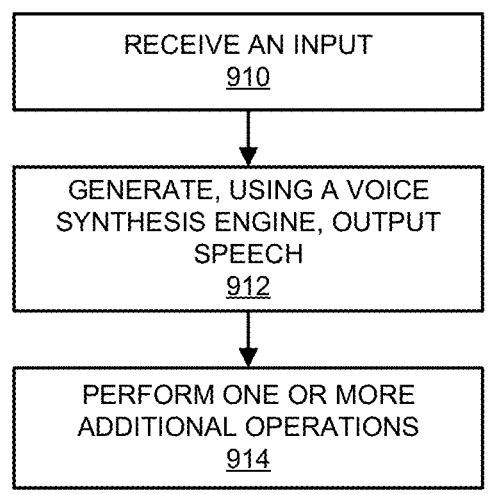
FIG. 9 is a flow diagram illustrating an example of a method for generating output speech in accordance with an embodiment of the present disclosure.

FIG. 9 presents a flow diagram illustrating an example of a method 900 for generating output speech, which may be performed by a computer or a computer system (such as computer system 118 in FIG. 1). Notably, the computer system may include a computation device that performs method 200. For example, the computation device may include one or more of: a processor, one or more cores in a second processor, or another type of device that performs computation (such as one or more GPUs, which may implement a neural network).

During operation, the computer system may receive an input (operation 910) associated with a type of interaction. For example, the input may include one of: text; or speech of a second individual, who is different from the individual. Note that the type of interaction may include one of: a conversation, an address to an audience, or reading of text.

Then, the computer system may generate, using a voice synthesis engine, the output speech (operation 912) corresponding to an individual based at least in part on the input, where the voice synthesis engine predicts positions and duration of a prosodic characteristic of speech by the individual, and selectively adds the prosodic characteristic of the speech by the individual in the output speech based at least in part on the prediction. For example, the prediction of the temporal positions and duration of the prosodic characteristic may be based at least in part on a predetermined histogram of occurrences of the prosodic characteristic as a function of time interval in the individual's speech. This histogram may be an input to the voice synthesis engine or may be included or integrated into the voice synthesis engine (such as during training of a neural network). Note that the prosodic characteristic may include: pauses in the speech by the individual, and/or disfluences in the speech by the individual.

In some embodiments, the voice synthesis engine may include a recurrent neural network that randomly or pseudo-randomly adds the prosodic characteristic to the output speech based at least in part on a predetermined histogram of occurrences of the prosodic characteristic of the individual during time intervals. For example, the voice synthesis engine may include a long short-term memory model using a recurrent neural network architecture.

In some embodiments, the computer system may optionally perform one or more additional operations (operation 914). For example, the computer system may generate, using a rendering engine, video of a visual representation corresponding to the individual based at least in part on the output speech, where the video of the visual representation may include facial and lip movements corresponding to and synchronized with the generated output speech. Next, the computer system may provide the video of the visual representation and the output speech.

Moreover, the computer system may determine, using a natural language processing engine, a response based at least in part on the input. Moreover, generating the output speech (operation 912) may include changing, using a natural language processing engine, a lexicography in the response to a different lexicography of the individual.

Furthermore, the output speech may be generated (operation 912) based at least in part on a gender of the individual, an ethnicity of the individual and/or a demographic attribute associated with the individual.

Additionally, the voice synthesis engine may selectively add the prosodic characteristic based at least in part on the type of interaction. For example, the selective adding may be enabled during a conversation, and may be disabled during an address or the reading of text.

In some embodiments of method 900, there may be additional or fewer operations. Furthermore, there may be different operations. Moreover, the order of the operations may be changed, and/or two or more operations may be combined into a single operation.

Figure 10:
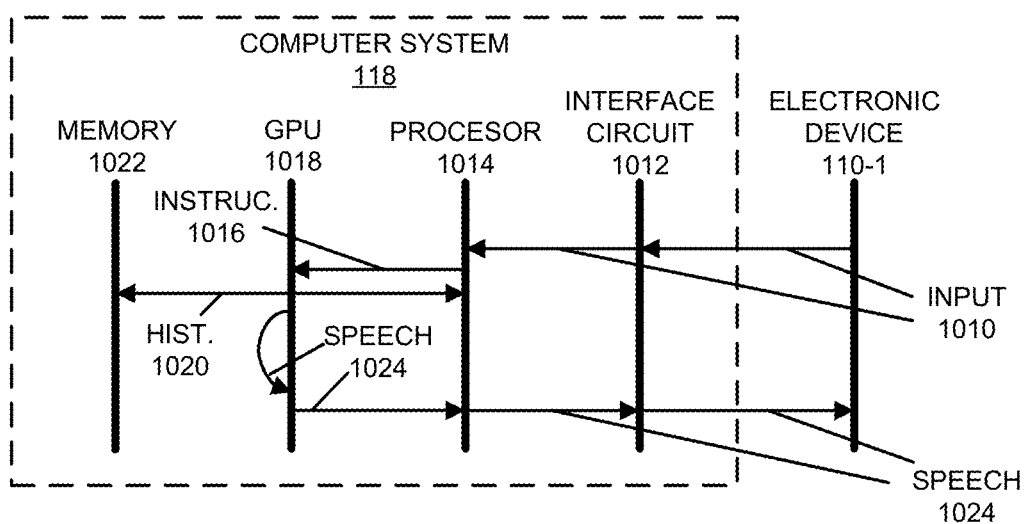
FIG. 10 is a drawing illustrating an example of communication among components in the computer system in FIG. 1 in accordance with an embodiment of the present disclosure.

Embodiments of the training techniques are further illustrated in FIG. 10, which presents a drawing illustrating an example of communication among components in system 100 (FIG. 1). Notably, during the training techniques, electronic device 110-1 may provide an input 1010 associated with a type of interaction to computer system 118. For example, input 1010 may include speech of a user of electronic device 110-1, such as a question (How are you?') for a mind twin or puppet, which may correspond to an individual.

After receiving input 1010, interface circuit 1012 in computer system 118 may provide input 1010 to processor 1014 in computer system 118. Then, processor 1014, which executes program instructions, may provide an instruction 1016 to one or more GPUs (such as GPU 1018) in computer system 118 to generate, using a voice synthesis engine (such as a recurrent neural network) that is implemented by the one or more GPUs, output speech 1024 corresponding to the individual based at least in part on input 1010. While generating output speech 1024, the one or more GPUs (such as GPU 1018) may access a histogram of occurrences 1020 associated with speech of the individual in memory 1022 in computer system 118. Note that the voice synthesis engine may predict positions and duration of a prosodic characteristic of speech by the individual (such as a pause and/or a disfluence), and may selectively add the prosodic characteristic of the speech by the individual in output speech 1024 based at least in part on the prediction.

Next, processor 1014 may provide the generated output speech 1024 to interface circuit 1012, which may provide the output speech 1024 (as well as additional generated media, such as a corresponding visual representation of the mind twin) to electronic device 110-1. After receiving the generated output speech 1024, electronic device 110-1 may provided it to a user of electronic device 110-1, such as by outputting the output speech 1024 using one or more loudspeakers.

While FIG. 10 illustrates unilateral communication between components (as shown using one-sided arrows), in some embodiments one or more of these communication operations involve bilateral communication.

Figure 11:
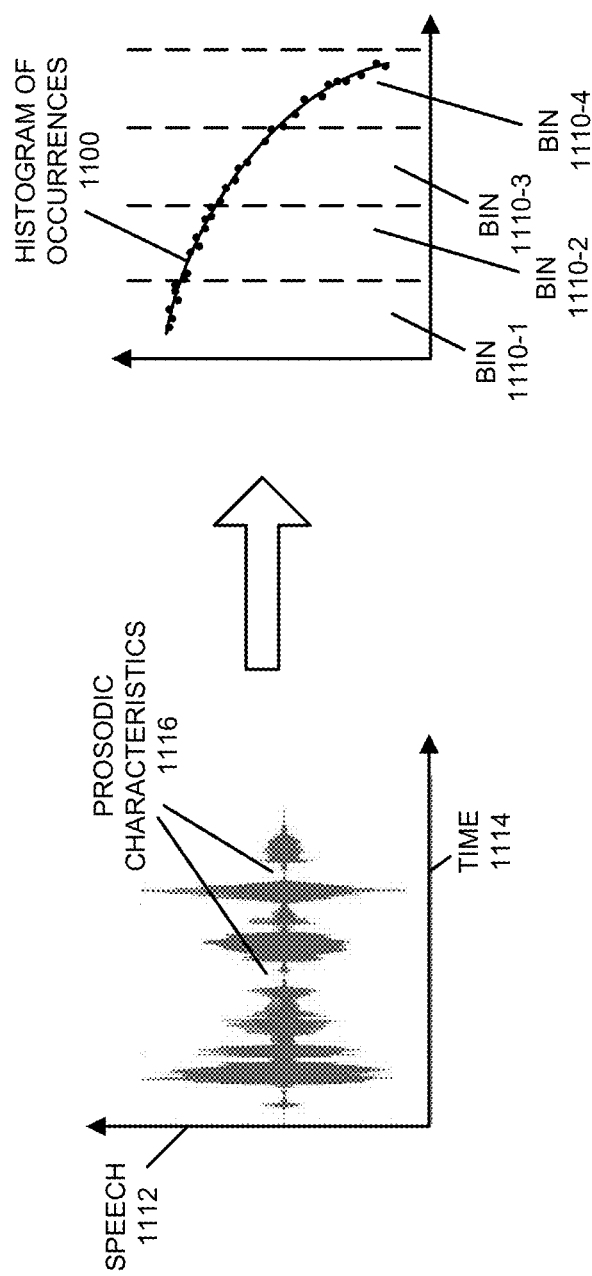
FIG. 11 is a drawing illustrating an example of generating a histogram of occurrences from a speech sequence in accordance with an embodiment of the present disclosure.

FIG. 11 presents a drawing illustrating an example of generating a histogram of occurrences 1100 as a function of time interval from a speech sequence. Notably, prosodic characteristics 1116 in speech 1112 as a function of time 1114 may be identified and represented using histogram of occurrences 1100. For example, prosodic characteristics 1116 may be assigned to different bins 1110 corresponding to different time intervals or durations in speech 1112. Note that the time intervals included in bins 1110 may increase monotonically, e.g., bin 1110-2 may correspond to larger time intervals between prosodic characteristics 1116 in speech 1112 than bin 1110-1, etc. Thus, the histogram of occurrences 1100 may be used to convert a continuous-time phenomenon into a discrete-time distribution. Moreover, different histograms may be determined and used for different types of prosodic characteristics.

In some embodiments, the position and duration of pauses (and, more generally, prosodic characteristics) in read out and spontaneous speech are analyzed and models that predict them in real-time are determined. The prediction of pauses can be useful in building a natural-sounding text-to-speech (TTS) systems.

For example, a self-supervised approach may be used to determine labeled data from raw audio. In some embodiments, two different types of audio data are used: read out audio (such as as found in audiobooks, speeches, etc.), and conversational audio. Each of these types of audio data may have different prosodic characteristics. Furthermore, audio data from a wide cohort of different ethnicity, gender and demographic attributes may be used in order to capture cultural and/or gender-specific variations. The self-training approach may generate the labels at the cost of automatic speech recognition/transcription of the raw audio.

Additionally, where to insert the pauses in a sentence may be modeled using a sequence model, such as a long short-term memory model. The long short-term memory model may be conditioned on the speaker (e.g., an individual), the type of audio data, gender, culture and/or demographic attributes that allow computer system 118 (FIG. 1) to insert the pauses in generated output sound.

In some embodiments, a self-training model of prosody in speech may be used to generate output sound for a mind twin. For example, prosodic characteristics may include: pauses (for clarity or effect), disfluences, etc. The prosodic characteristics can be extracted from audio content and used to generate distributions or a histogram of occurrences (with, e.g., four or five bins). Then, using the histogram of occurrences, prosodic characteristics in speech can be predicted.

As noted previously, a sequential modeling technique for prosodic characteristics, such as pauses, may be used. For example, sequential modeling technique may use a recurrent neural network (such as a GRU or a long short-term memory model) to predict a prosodic characteristic. Notably, when a response is provided (e.g., 'it was the best of times, and the worst of times'), the recurrent neural network may be used to predict pause locations and pause lengths. This may allow synthesized audio with natural pauses to be generated, e.g., by adding a random pause based on a particular bin in a histogram of occurrences. This approach may allow the output speech to be synthesized with control. Thus, a type of prosodic characteristic can depend on the context, such that it can be turned off when a mind twin is reading a book versus having a conversation. Note that a similar framework can be used for different kinds or types of disfluences (such as um, er, like, you know, right, ah, etc.) and, more generally, different prosodic characteristics.

We now describe embodiments of an electronic device. FIG. 12 presents a block diagram illustrating an electronic device 1200, such as one of electronic devices 110, the optional base station 112, the optional access point 116 and/or computer system 118 in FIG. 1. This electronic device includes processing subsystem 1210, memory subsystem 1212, and networking subsystem 1214. Processing subsystem 1210 includes one or more devices configured to perform computational operations (which are sometimes referred to as 'computational devices'). For example, processing subsystem 1210 can include one or more microprocessors, one or more application-specific integrated circuits (ASICs), one or more microcontrollers, one or more programmable-logic devices, one or more GPUs and/or one or more digital signal processors (DSPs).

Memory subsystem 1212 includes one or more devices for storing data and/or instructions for processing subsystem 1210 and networking subsystem 1214. For example, memory subsystem 1212 can include dynamic random access memory (DRAM), static random access memory (SRAM), and/or other types of memory. In some embodiments, instructions for processing subsystem 1210 in memory subsystem 1212 include: one or more program modules or sets of instructions (such as program instructions 1222 or operating system 1224), which may be executed by processing subsystem 1210. Note that the one or more computer programs may constitute a computer-program mechanism. Moreover, instructions in the various modules in memory subsystem 1212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1210.

In addition, memory subsystem 1212 can include mechanisms for controlling access to the memory. In some embodiments, memory subsystem 1212 includes a memory hierarchy that comprises one or more caches coupled to a memory in electronic device 1200. In some of these embodiments, one or more of the caches is located in processing subsystem 1210.

In some embodiments, memory subsystem 1212 is coupled to one or more high-capacity mass-storage devices (not shown). For example, memory subsystem 1212 can be coupled to a magnetic or optical drive, a solid-state drive, or another type of mass-storage device. In these embodiments, memory subsystem 1212 can be used by electronic device 1200 as fast-access storage for often-used data, while the mass-storage device is used to store less frequently used data.

Figure 13:
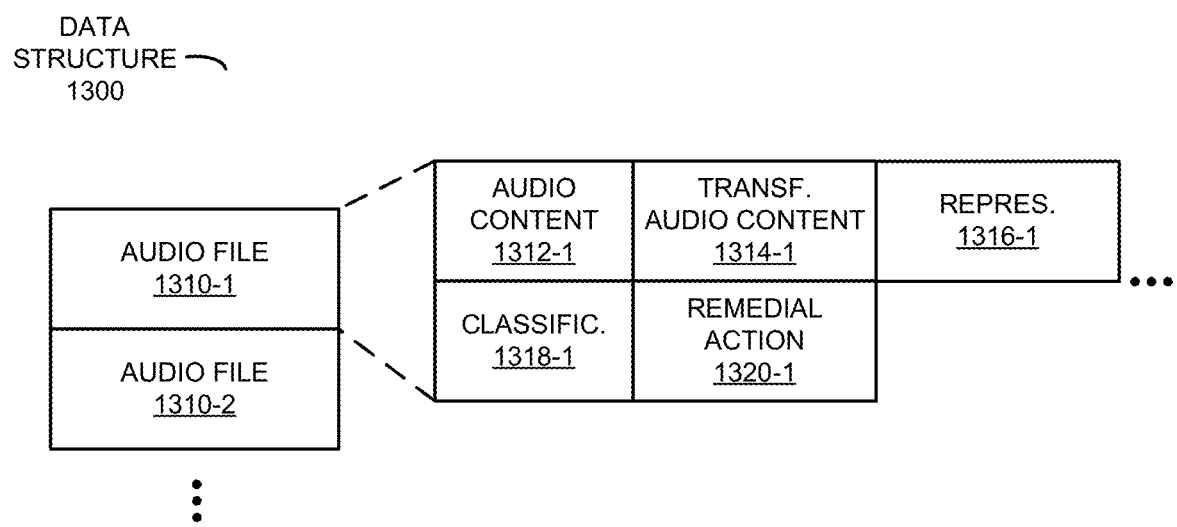
FIG. 13 is a block diagram illustrating a data structure for use in conjunction with the electronic device of FIG. 12 in accordance with an embodiment of the present disclosure.

Memory subsystem 1212 may store information that is used during the audio analysis techniques. This is shown in FIG. 13, which presents a block diagram illustrating a data structure 1300 for use in conjunction with electronic device 1200 (FIG. 12). This data structure may include multiple audio files 1310 with: audio content (such as audio content 1312-1), transformed audio content (such as transformed audio content 1314-1), one or more representations (such as representation(s) 1316-1) of the transformed audio content, a classification (such as classification 1318-1), e.g., whether the audio content is associated with real or fake media, and/or a remedial action (such as 1320-1), e.g., a recommendation to not play fake media.

In other embodiments, the order of items in data structure 1300 can vary and additional and/or different items can be included. Moreover, other sizes or numerical formats and/or data can be used.

Referring back to FIG. 12, networking subsystem 1214 includes one or more devices configured to couple to and communicate on a wired and/or wireless network (i.e., to perform network operations), including: control logic 1216, an interface circuit 1218, one or more antennas 1220 and/or input/output (I/O) port 1230. (While FIG. 12 includes one or more antennas 1220, in some embodiments electronic device 1200 includes one or more nodes 1208, e.g., a pad, which can be coupled to one or more antennas 1220. Thus, electronic device 1200 may or may not include one or more antennas 1220.) For example, networking subsystem 1214 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 1214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 1200 may use the mechanisms in networking subsystem 1214 for performing simple wireless communication between the electronic devices, e.g., transmitting advertising or beacon frames and/or scanning for advertising frames transmitted by other electronic devices as described previously.

Within electronic device 1200, processing subsystem 1210, memory subsystem 1212, and networking subsystem 1214 are coupled together using bus 1228. Bus 1228 may include an electrical, optical, and/or electro-optical connection that the subsystems can use to communicate commands and data among one another. Although only one bus 1228 is shown for clarity, different embodiments can include a different number or configuration of electrical, optical, and/or electro-optical connections among the subsystems.

In some embodiments, electronic device 1200 includes a feedback subsystem 1226 that provides or presents information (such as an alert or warning associated with audio content or a video with associated audio content, or graphical information that specifies a trustworthiness of audio content or a video) to a user of electronic device 1200 (or another electronic device). For example, feedback subsystem 1226 may include a display subsystem that displays the information on a display, which may include a display driver and the display, such as a liquid-crystal display, a multi-touch touchscreen, etc.

Electronic device 1200 can be (or can be included in) any electronic device with at least one network interface. For example, electronic device 1200 can be (or can be included in): a desktop computer, a laptop computer, a subnotebook/netbook, a server, a mainframe computer, a cloud-based computer system, a tablet computer, a smartphone, a cellular telephone, a smart watch, a headset, electronic or digital glasses, headphones, a consumer-electronic device, a portable computing device, an access point, a router, a switch, communication equipment, test equipment, a wearable device or appliance, and/or another electronic device.

Although specific components are used to describe electronic device 1200, in alternative embodiments, different components and/or subsystems may be present in electronic device 1200. For example, electronic device 1200 may include one or more additional processing subsystems, memory subsystems, networking subsystems, and/or feedback subsystems (such as an audio subsystem). Additionally, one or more of the subsystems may not be present in electronic device 1200. Moreover, in some embodiments, electronic device 1200 may include one or more additional subsystems that are not shown in FIG. 12. Also, although separate subsystems are shown in FIG. 12, in some embodiments, some or all of a given subsystem or component can be integrated into one or more of the other subsystems or component(s) in electronic device 1200. For example, in some embodiments program instructions 1222 are included in operating system 1224.

Moreover, the circuits and components in electronic device 1200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1214, such as a radio. Moreover, the integrated circuit may include hardware and/or software mechanisms that are used for transmitting wireless signals from electronic device 1200 and receiving signals at electronic device 1200 from other electronic devices. Aside from the mechanisms herein described, radios are generally known in the art and hence are not described in detail. In general, networking subsystem 1214 and/or the integrated circuit can include any number of radios. Note that the radios in multiple-radio embodiments function in a similar way to the described single-radio embodiments.

In some embodiments, networking subsystem 1214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, receiving the input data, etc.)

While communication protocols compatible with Ethernet, Wi-Fi and a cellular-telephone communication protocol were used as illustrative examples, the described embodiments of the audio analysis techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the audio analysis techniques may be implemented using program instructions 1222, operating system 1224 (such as a driver for interface circuit 1218) and/or in firmware in interface circuit 1218. Alternatively or additionally, at least some of the operations in the audio analysis techniques may be implemented in a physical layer, such as hardware in interface circuit 1218.

While the preceding embodiments illustrated particular approaches to identifying fake audio content or fake media (which may include related video content), in other embodiments different approaches may be used.

In the preceding description, we refer to 'some embodiments.' Note that 'some embodiments' describes a subset of all of the possible embodiments, but does not always specify the same subset of embodiments. Moreover, note that the numerical values provided are intended as illustrations of the audio analysis techniques. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
a computation device;
memory configured to store program instructions, wherein, when executed by the computation device, the program instructions cause the computer system to perform one or more operations comprising:
receiving audio content, wherein the audio content is allegedly associated with a given individual;
determining a representation of the audio content by performing a transformation on the audio content;
analyzing the representation using a predetermined neural network, wherein the audio content or the given individual has an associated context, and wherein the predetermined neural network is selected from a set of predetermined neural networks based at least in part on the context; and
classifying, based at least in part on an output of the predetermined neural network, the audio content as being fake or real, wherein the fake audio content is, at least in part, computer-generated; and
selectively performing a remedial action based at least in part on the classification.

2. The computer system of claim 1, wherein the transformation comprises a Fourier transform or a discrete Fourier transform; and
wherein the representation comprises a spectrogram, a phasegram or both.

3. The computer system of claim 1, wherein the transformation comprises a cosine transformation of a power spectrum of the audio content; and
wherein the representation comprises mel-frequency cepstral coefficients.

4. The computer system of claim 1, wherein the transformation comprises a neural network and the representation comprises word embedding or sense embedding of words in the audio content.

5. The computer system of claim 1, wherein the transformation comprises a signal-processing transformation.

6. The computer system of claim 1, wherein the analysis further uses a predetermined representation of audio content associated with the given individual based at least in part on historical audio content of the given individual.

7. The computer system of claim 1, wherein the context comprises: an environment where the audio content allegedly occurs, a gender of a given individual, an ethnicity of the given individual, a demographic attribute of the given individual, or a type of interaction with the given individual.

8. The computer system of claim 1, wherein the predetermined neural network was trained using synthetic audio content corresponding to different attack vectors used to generate fake audio content.

9. The computer system of claim 1, wherein the output comprises a probability and the classification is further based at least in part on a threshold.

10. The computer system of claim 9, wherein the threshold corresponds to the given individual.

11. The computer system of claim 1, wherein the predetermined neural network comprises multiple convolutional blocks, arranged sequentially, followed by a softmax layer.

12. The computer system of claim 11, wherein a given convolution block comprises a given convolution operation, a normalization operation and a max pool operation; and
wherein the given convolution operation corresponds to a given frequency range.

13. The computer system of claim 1, wherein the predetermined neural network comprises a generative adversarial network (GAN).

14. The computer system of claim 1, wherein the classification is performed using a classifier or a regression model that was trained using a supervised learning technique and a training dataset with additional audio content.

15. The computer system of claim 1, wherein the classification is performed using a classifier or a regression model that was trained using additional audio content that was classified as being fake or real audio content using an unsupervised learning technique.

16. The computer system of claim 1, wherein the remedial action comprises one of: providing a warning associated with the audio content; providing a recommendation associated with the audio content; or filtering at least a portion of the audio content.

17. A non-transitory computer-readable storage medium for use in conjunction with a computer system, the computer-readable storage medium configured to store program instructions that, when executed by the computer system, causes the computer system to perform one or more operations comprising:
 receiving audio content, wherein the audio content is allegedly associated with a given individual;
 determining a representation of the audio content by performing a transformation on the audio content;
 analyzing the representation using a predetermined neural network, wherein the audio content has an associated context, and wherein the predetermined neural network is selected from a set of predetermined neural networks based at least in part on the context; and
 classifying, based at least in part on an output of the predetermined neural network, the audio content as being fake or real, wherein the fake audio content is, at least in part, computer-generated; and
 selectively performing a remedial action based at least in part on the classification.

18. The non-transitory computer-readable storage medium of claim 17, wherein the predetermined neural network comprises convolutional blocks, arranged sequentially, followed by a softmax layer;
 wherein a given convolution block comprises a given convolution operation, a normalization operation and a max pool operation; and
 wherein the given convolution operation corresponds to a given frequency range.

19. A method for classifying audio content, wherein the method comprises:
 by a computer system:
 receiving the audio content, wherein the audio content is allegedly associated with a given individual;
 determining a representation of the audio content by performing a transformation on the audio content;
 analyzing the representation using a predetermined neural network, wherein the audio content has an associated context, and wherein the predetermined neural network is selected from a set of predetermined neural networks based at least in part on the context; and
 classifying, based at least in part on an output of the predetermined neural network, the audio content as being fake or real, wherein the fake audio content is, at least in part, computer-generated; and
 selectively performing a remedial action based at least in part on the classification.

20. The method of claim 19, wherein the predetermined neural network comprises convolutional blocks, arranged sequentially, followed by a softmax layer; and
 wherein a given convolution block comprises a given convolution operation, a normalization operation and a max pool operation; and
 wherein the given convolution operation corresponds to a given frequency range.

* * * * *